United States Patent [19]

Takayama et al.

[11] Patent Number: 5,730,527

[45] Date of Patent: Mar. 24, 1998

[54] METHOD AND APPARATUS FOR MEASURING TEMPERATURE USING AN OPTICAL FIBER

[75] Inventors: Takamitsu Takayama; Yoshiro Yamada, both of Kawasaki, Japan

[73] Assignee: NKK Corporation, Tokyo, Japan

[21] Appl. No.: 735,247

[22] Filed: Oct. 22, 1996

Related U.S. Application Data

[62] Division of Ser. No. 415,338, Apr. 3, 1995.

[30] Foreign Application Priority Data

May 30, 1994 [JP] Japan .................. 6-117172
May 30, 1994 [JP] Japan .................. 6-177173

[51] Int. Cl.$^6$ .................. G01K 13/00; G01J 5/08
[52] U.S. Cl. .................. 374/131; 374/140; 374/127; 364/557; 266/99
[58] Field of Search .................. 374/140, 131, 374/130, 127; 299/99, 88; 364/557

[56] References Cited

U.S. PATENT DOCUMENTS 4,576,486  3/1986  Dils ........................ 374/131

FOREIGN PATENT DOCUMENTS 0218157   4/1987   European Pat. Off. .
5-142049  6/1993   Japan .
5-248960  9/1993   Japan .

OTHER PUBLICATIONS

Patent Abstracts of Japan, vol. 011, No. 194 (P–588), Jun. 23, 1987 & JP-A-62 019727 (Japan SENSAA Corp: KK; Others: 01), Jan. 28, 1987.

Measurements, vol. 11, No. 3, Jun. 1, 1993 pp. 211–221, XP 000396976 TSAI B K et al "Application of Dual-Wavelength Radiation Thermometry to the Aluminum Industry".

*Primary Examiner*—Diego F. F. Gutierrez
*Attorney, Agent, or Firm*—Frishauf, Holtz, Goodman, Langer & Chick

[57] ABSTRACT

A method and apparatus for measuring a true temperature using a consumable optical fiber, wherein received light emitted from a high temperature liquid is divided into two light beams through a branching filter. A light of a first wave band from a first light beam of the two light beams is detected by a first radiation thermometer, and the light of the first wave band is converted into temperature to output a first temperature. A light of a second wave band from a second light beam of the two light beams is detected by a second radiation thermometer, and the light of the second wave band is converted into temperature to output a second temperature. The true temperature is then calculated by using two first temperature-conversion-parameters inherent to the first radiation thermometer, a first transmission loss index in the first wave band by the first radiation thermometer, the outputted first temperature from the first radiation thermometer, two second temperature-conversion-parameters inherent to the second radiation thermometer, a second transmission loss index in the second wave band by the second radiation thermometer, the outputted second temperature from the second radiation thermometer.

4 Claims, 9 Drawing Sheets

METHOD AND APPARATUS FOR MEASURING TEMPERATURE USING AN OPTICAL FIBER

This is a division of application Ser. No. 08/415,338 filed Apr. 3, 1995.

BACKGROUND OF THE INVENTION

1. Field of the Invention

The present invention relates to a method for measuring temperature using an optical fiber and an apparatus therefor.

2. Description of the Related Arts

Thermocouples of a consumable type have widely been used to determine a temperature of molten metals. Using detachable sensor probes of the disposable type, the temperature measurement is intermittent. Thus, because the sensor probe has to be replaced in every measurement, an increase in the number of measurements is difficult owing to the high price of the sensor probe, and automatic operation is also difficult. In addition, since the probe has a diameter as large as 30 mm or more and since it has a length of 1 m or more, a measurement in a narrow space can not be performed.

There is an increasing demand for continuous temperature measurement of molten metal. Responding to the situation, a practical unit has been introduced. The unit uses a ceramic protective tube immersed into a molten metal. A thermocouple is inserted into the protective tube to perform the continuous measurement of temperature. A problem of this method is the durability of the protective tube, and the method conducts the temperature measurement only for 40 to 50 hours. This method also has a problem in that the protective tube is expensive and in that the method has poor response to temperature fluctuation.

Aiming to solve the problems described above, the inventors of the present invention proposed temperature measuring equipment and level measuring equipment for molten metal, which are disclosed in JP-A-248960/93 (the term "JP-A-" referred to herein simplify "unexamined Japanese patent publication"). According to the patent publication, the thermometer continuously determines a temperature of a molten metal by continuously immersing an optical fiber covered with a metallic tube into the molten metal and by detecting infrared rays transmitted through the optical fiber. With the enhanced mechanical strength of the optical fiber owing to the coverage of metallic tube, the optical fiber is able to be immersed into the molten metal.

However, a radiation thermometer of that type which consumes optical fiber during temperature measurement has disadvantages such that, with the reduction of the fiber length, transmission loss is reduced, indication temperature is increased, measurement error are generated, and detected light quantity in increased to exceed the capacity of a radiation thermometer.

When a quartz optical fiber, such as a GI fiber (with a ratio of core diameter to clad diameter is 50/125 µm), was used as the light waveguide, and when a radiation light emitted from a high temperature target was introduced from an end of the optical fiber, and when a Si detector having a receiving wavelength of 0.9 µm and an infrared radiation thermometer which were positioned at the other end of the optical fiber were used to determine a temperature of about 1200° C., the generated error was about 10° C. per 100 m of reduction of optical fiber length.

A method for compensating the measurement error caused by the reduction of length of the optical fiber described above has been developed. According to the method, the feed length of optical fiber is determined by a mechanism such as a touch-roll, and the attenuation is calculated from a know transmission loss of the fiber to correct the error. The equipment for performing the method is, however, complex. Furthermore, non-uniformity of the optical fiber transmission loss characteristics interferes in obtaining sufficient correction accuracy for a long optical fiber, at around 1 km. For the correction of a reduction of optical fiber having a length of several hundreds meters, no satisfactory correction accuracy can be obtained unless the correct value of transmission loss of the fiber is known.

A corrective method of the length of optical fiber without using other temperature measuring means such as a thermocouple is disclosed by JP-A-142049/93 which was also filed by the inventors of the present invention. The disclosure describes a consumable optical fiber thermometer which uses two units of infrared thermometers each of which detects light of different wavelength. The true temperature is determined using the difference of transmission loss characteristic of the optical fiber in each wavelength (a correction method of optical fiber length using two wavelengths).

The corrective method against the reduction of optical fiber length using two wavelengths disclosed by JP-A-142049/93 has problems described below.

(1) JP-A-142049/93 derived a correction equation for a single spectrum from Wien's equation. Ordinary radiation thermometers, however, receive light having spectra of a certain band width, not having a single spectrum. Accordingly, it is common practice for ordinary radiation thermometers to adopt a modified equation using experimentally defined constants, A, B, and C, as the temperature conversion equation for a band spectral light, instead of Wien's equation. As a result, an error appears between the conversion output obtained from an actual radiation thermometer and the output of a temperature conversion equation which is a basis of each correction equation.

(2) Since the correction equation described in JP-A-142049/93 adopts an approximation during its derivation, it contains an approximation error. Therefore, even in a radiation thermometer which uses Wien's equation as the conversion equation under a condition of sufficiently narrow receiving-light spectral band, the correction error in calculation increases with the increase of optical fiber consumption during actual observation. As a result, to maintain the correction error within 1° C. the fiber length is limited to 400 m or less.

SUMMARY OF THE INVENTION

It is an object of the present invention to provide a method for measuring temperature using a consumable optical fiber and an apparatus therefor, wherein a temperature of high temperature molten metal is measured with high accuracy of within ±2° C. of error, at a high response rate, continuously, and at a low cost even when a long optical fiber of 1 km for example, is used.

In order to attain this object, firstly, the present invention provides a method for measuring temperature using consumable optical fiber comprising the steps of:

receiving a light emitted from a high temperature liquid at an end of a consumable optical fiber, the received light being transmitted through the consumable optical fiber to the other end of the consumable optical fiber;

dividing the received light into two light beams through a branching filter;

detecting a light of a first wave band from a first light beam of the two light beams by a first radiation thermometer;

converting the light of the first wave band into temperature to output a first temperature;

detecting a light of a second wave band from a second light beam of the two light beams by a second radiation thermometer, the second wave band being different from the first wave band;

converting the light of the second wave band into temperature to output a second temperature;

calculating a true temperature by using two first temperature-conversion-parameters inherent to the first radiation thermometer, a first transmission loss index in the first wave band by the first radiation thermometer, the outputted first temperature from the first radiation thermometer, two second temperature-conversion-parameters inherent to the second radiation thermometer, a second transmission loss index in the second wave band by the second radiation thermometer and the outputted second temperature from the second radiation thermometer.

Secondly, the present invention provides an apparatus for measuring temperature using consumable optical fiber comprising:

a consumable optical fiber for receiving a light emitted from a high temperature liquid at an end thereof and transmitting the light to the other end thereof;

a branching filter for dividing the received light into two light beams;

a first radiation thermometer for detecting a light of a first wave band from a first light beam of the two light beams and converting the light of the first wave band into temperature to output a first temperature;

a second radiation thermometer for detecting a light of a second wave band from a second light beam of the two light beams and converting the light of the second wave band into temperature to output a first temperature, the second wave band being different from the first wave band;

calculation means for calculating a true temperature by using two first temperature-conversion-parameters inherent to the first radiation thermometer, a first transmission loss index in the first wave band by the first radiation thermometer, the outputted first temperature from the first radiation thermometer, two second temperature-conversion-parameters inherent to the second radiation thermometer, a second transmission loss index in the second wave band by the second radiation thermometer and the outputted second temperature from the second radiation thermometer.

Thirdly, the present invention provides a method for measuring temperature using consumable optical fiber comprising the steps of:

receiving a light emitted from a high temperature liquid at an end of a consumable optical fiber, the received light being transmitted through the consumable optical fiber to the other end of the consumable optical fiber;

dividing the received light into two light beams through a branching filter;

a first filter step of filtering a first light beam of the two light beams by a first wave selective filter to pass a narrow band light of a wavelength ($\lambda_a$);

a first detection step of receiving and detecting the narrow band light of the wavelength ($\lambda_a$) by a first radiation thermometer;

a first conversion step of converting the narrow band light of the wavelength ($\lambda_a$) into temperature to output a temperature ($T_a$);

a second filter step of filtering a second light beam of the two light beams by a second wave selective filter to pass a narrow band light of a wavelength ($\lambda_b$);

a second detection step of receiving and detecting the narrow band light of the wavelength ($\lambda_b$) by a second radiation thermometer;

a second conversion step of converting the narrow band light of the wavelength ($\lambda_b$) into temperature to output a temperature ($T_b$);

calculating a true temperature (T) by using the following equation:

$$T=(1/D_a\lambda_a-1/D_b\lambda_b)\div(1/D_a\lambda_aT_a-1/D_b\lambda_bT_b)$$

wherein

T: the true temperature, $\lambda_a$: the wavelength of the first radiation thermometer, $D_a$: a transmission loss index of the optical fiber in the wavelength ($\lambda_a$), $T_a$: the temperature outputted from the first radiation thermometer, $\lambda_b$: the wavelength of the second radiation thermometer, $D_b$: a transmission loss index of the optical fiber in the wavelength ($\lambda_a$), $T_b$: the temperature outputted from the second radiation thermometer.

Fourthly, the present invention provides an apparatus for measuring temperature using consumable optical fiber comprising:

a consumable optical fiber for receiving a light emitted from a high temperature liquid at an end thereof and transmitting the light to the other end thereof;

a branching filter for dividing the received light into two light beams;

a first wave selective filter for filtering a first light beam of the two light beams to pass a narrow band light of a wavelength ($\lambda_a$);

a first radiation thermometer for receiving and detecting the narrow band light of the wavelength ($\lambda_a$) and converting the narrow band light of the wavelength ($\lambda_a$) into temperature to output a temperature ($T_a$);

a second wave selective filter for filtering a second light beam of the two light beams to pass a narrow band light of a wavelength ($\lambda_b$);

a second radiation thermometer for receiving and detecting the narrow band light of the wavelength ($\lambda_b$) and converting the narrow band light of the wavelength ($\lambda_b$) into temperature to output a temperature ($T_b$);

means for calculating a true temperature (T) by using the following equation:

$$T=(1/D_a\lambda_a-1/D_b\lambda_b)\div(1/D_a\lambda_aT_a-1/D_b\lambda_bT_b)$$

wherein

T: the true temperature, $\lambda_a$: the wavelength of the first radiation thermometer, $D_a$: a transmission loss index of the optical fiber in the wavelength ($\lambda_a$), $T_a$: the temperature outputted from the first radiation thermometer, $\lambda_b$: the wavelength of the second radiation thermometer, $D_b$: a transmission loss index of the optical fiber in the wavelength ($\lambda_b$), $T_b$: the temperature outputted from the second radiation thermometer.

Fifthly, the present invention provides a method for measuring temperature using consumable optical fiber comprising the steps of:

receiving a light emitted from a high temperature liquid at an end of a consumable optical fiber, the received light being transmitted through the consumable optical fiber to the other end of the consumable optical fiber;

filtering the received light to pass solely a narrow band spectral light having a predetermined central wavelength by a wave selective filter; and converting the narrow band spectral light into temperature by a radiation thermometer.

Sixthly, the present invention provides an apparatus for measuring temperature using consumable optical fiber comprising:

a consumable optical fiber for receiving a light emitted from a high temperature liquid at an end thereof and transmitting the light to the other end thereof;

a wave selective filter for filtering the received light to pass solely a narrow band spectral light having a predetermined central wavelength; and a radiation thermometer fop detecting the narrow band spectral light and converting the spectral light into temperature.

Seventhly, the present invention provides a method for measuring temperature using consumable optical fiber comprising the steps of:

receiving a light emitted from a high temperature liquid at an end of a consumable optical fiber, the received light being transmitted through the consumable optical fiber to the other end of the consumable optical fiber;

dividing the received light into two light beams through a branching filter;

a first filter step of filtering a first light beam of the two light beams by a first wave selective filter to pass a first spectral light having a predetermined central wavelength and a wave band;

a first detection step of detecting the spectral light by a first radiation thermometer and converting the detected spectral light into temperature to output a temperature ($T_a$);

a second filter step of filtering a second light beam of the two light beams by a second wave selective filter to pass a second spectral light having a predetermined central wavelength;

a second detection step of detecting the spectral light by a second radiation thermometer and converting the detected spectral light into temperature to output a temperature ($T_b$);

calculating a true temperature (T) by using temperature conversion parameters inherent to the first radiation thermometer and the second radiation thermometer, transmission loss informations of the optical fiber regarding to the first spectral light and the second spectral light, and the temperature ($T_a$) and temperatures ($T_b$).

Eigthly the present invention provides an apparatus for measuring temperature using consumable optical fiber comprising:

a consumable optical fiber for receiving a light emitted from a high temperature liquid at an end thereof and transmitting the light to the other end thereof;

a branching filter for dividing the received light into two light beams;

a first wave selective filter for filtering a first light beam of the two light beams to pass a first spectral light having a predetermined central wavelength and a wave band;

a first radiation thermometer for receiving and detecting the first spectral light and converting the first spectral light into temperature to output a temperature ($T_a$);

a second wave selective filter for filtering a second light beam of the two light beams to pass a second spectral light having a predetermined central wavelength and a wave band, the wave band of the second spectral light being different from that of the first spectral light;

a second radiation thermometer for receiving and detecting the second spectral light and converting the second spectral light into temperature to output a temperature ($T_b$);

means for calculating a true temperature (T) by using temperature conversion parameters inherent to the first radiation thermometer and the second radiation thermometer, transmission loss informations of the optical fiber regarding to the first spectral light and the second spectral light, and the temperature ($T_a$) and temperatures ($T_b$).

DESCRIPTION OF THE EMBODIMENT

EMBODIMENT-1

Figure 1:
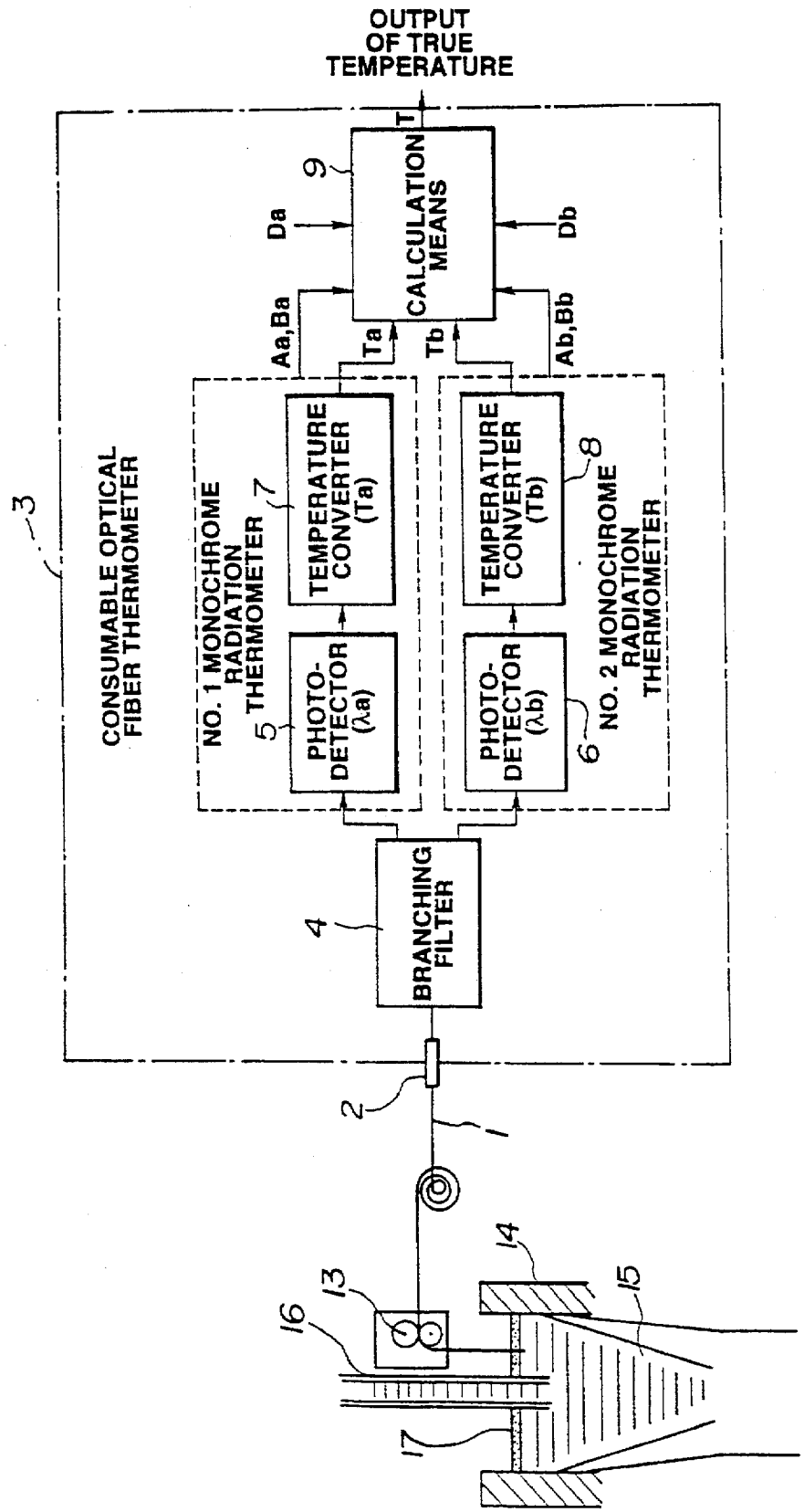
FIG. 1 illustrates an example of an apparatus for measuring temperature using a consumable optical fiber of the present invention.

According to the method f or measuring temperature of the present invention, a consumable optical fiber is used. A light emitted from a high temperature liquid is received at an end of the consumable optical fiber. The received light is transmitted through the consumable optical fiber to the other end of the consumable optical fiber. The received light is divided through a branching filter into two light beams, i.e. a first light beam and a second light beam. From the first light beam, a light of a first wave band is detected by a first radiation thermometer. The detected light of the first wave band is converted into temperature to output a first temperature. From the second light beam, a light of a second wave band is detected by a second radiation thermometer. The detected light of the second wave band is converted into temperature to output a second temperature. A true temperature (T) of the high temperature liquid is calculated, by using two first temperature-conversion-parameters inherent to the first radiation thermometer, a first transmission loss index in the first wave band by the first radiation thermometer, and the first temperature from the first radiation thermometer, two second temperature-conversion-parameters inherent to the second radiation thermometer, a second transmission loss index in the second wave band by the second radiation thermometer and the second temperature from the second radiation thermometer.

The true temperature T is calculated by using the following equation:

$$T=[(1/D_a A_a-1/D_b A_b)-2(B_a/D_a A_a^2 T_a-B_b/D_b A_b^2 T_b)]\div[(1/D_a A_a T_a-1/D_b A_b T_b)-2(B_a/D_a A_a^2 T_a^2-B_b/D_b A_b^2 T_b^2)] \quad (1)$$

wherein

T: the true temperature, $T_a$: the first temperature outputted from the first radiation thermometer, $A_a$, $B_a$: the two first parameters inherent to the first radiation thermometer, $D_a$: the first transmission loss index of the optical fiber by the first radiation thermometer, $T_b$: the second temperature outputted from the second radiation thermometer, $A_b$, $B_b$: the two second parameters inherent to the second radiation thermometer, $D_b$: the second transmission loss index of the optical fiber by the second radiation thermometer.

Further, the true temperature T is calculated by using the following equation;

$$T=[(1-2B_a/A_a T_a')T_a/D_a A_a-(1-2B_b/A_b T_b')T_b/D_b A_b]\div[(1-2B_a/A_a T_a')D_a A_a-(1-2B_b/A_b T_b')D_b A_b] \quad (2)$$

wherein

T: the true temperature, $T_a$: the first temperature outputted from the first radiation thermometer, $A_a$, $B_a$: the two first parameters inherent to the first radiation thermometer, $D_a$: the first transmission loss index of the optical fiber by the first radiation thermometer, $T_a'$: an approximate value which is set based on a specified measuring range of the first radiation thermometer, $T_b$: the second temperature outputted from the second radiation thermometer, $A_b$, $B_b$: the two second parameters inherent to the second radiation thermometer, $D_b$: the second transmission loss index of the optical fiber by the second radiation thermometer.

$T_b'$: an approximate value which is set based on a specified measuring range of the second radiation thermometer.

According to another method measuring temperature of the present invention, a consumable optical fiber is also used. A light emitted from a high temperature liquid is received at an end of the consumable optical fiber. The received light being transmitted through the consumable optical fiber to the other end of the consumable optical fiber. The received light is divided through a branching filter into two light beams, i.e. a first light beam and a second light beam. The first light beam is filtered to pass a first narrow band light of a first wavelength $\lambda_a$. The first narrow band light of the first wavelength $\lambda_a$ is received and detected by by a first radiation thermometer. The detected first narrow band light of the first wavelength $\lambda_a$ is converted into temperature to output a first temperature $T_a$. The second light beam is filtered to pass a second narrow band light of a second wavelength $\lambda_b$. The second narrow band light of the second wavelength $\lambda_b$ is received and detected by by a second radiation thermometer. The detected second narrow band light of the second wavelength $\lambda_b$ is converted into temperature to output a second temperature $T_b$. A a true temperature T is calculated by using the following equation:

$$T=(1/D_a\lambda_a-1/D_b\lambda_b)\div(1/D_a\lambda_a T_a-1/D_b\lambda_b T_b) \quad (3)$$

wherein

T: the true temperature, $\lambda_a$: the first wavelength of the first radiation thermometer, $D_a$: a transmission loss index of the optical fiber in the first wavelength ($\lambda_a$), $T_a$: the first temperature outputted From the first radiation thermometer, $\lambda_b$: the second wavelength of the first radiation thermometer, $D_b$: a transmission loss index of the optical fiber in the second wavelength ($\lambda_b$), $T_b$: the second temperature outputted from the second radiation thermometer.

EXAMPLE-1

First, the sensitive characteristics of a radiation thermometer taking into account of the attenuation of optical fiber transmission are described below. The spectral radiation brightness L ($\lambda$, T) of a black body is expressed by equation (4) based on Plank's law.

$$L(\lambda,T)=2C_1/\{\lambda^5\times(EXP(C_2/\lambda T)-1)\} \quad (4)$$

where $\lambda$: wavelength

T: absolute temperature (K)

$C_1$: $5.9548\times 10^{-7}$ W×m²

$C_2$: 0.014388 m·K

Equation (4) is approximated by Wien's equation (5) within a range of $\lambda T \leq \lambda_m$ T, ($\lambda_m$ T=$2.8978\times 10^{-3}$ m·K).

$$L(\lambda,T)=2C_1\times EXP(-C_2/\lambda T)/\lambda^5 \quad (5)$$

In an ordinary radiation thermometer, the brightness signals are converted to temperature using an approximation equation (6) which uses coefficients A, B, and C which were determined by experiments in accordance with JIS (refer to "New temperature measurement" p256, Instrumentation and Automatic Control Academy).

$$L(\lambda,T)=C\times EXP\{-C_2/(AT+B)\} \quad (6)$$

FIG. 1 shows an example of an apparatus for measuring temperature using a consumable optical fiber of the present invention. In FIG. 1, the reference numeral 1 denotes an optical fiber covered with a metallic tube, 2 denotes an optical connector, 3 denotes a consumable optical fiber thermometer which is structured with devices 4 through 9 described below. The reference numeral 4 is a branching filter such as a beam splitter, which disperses a light entering from an end of the optical fiber 1 covered with the metallic tube via the optical connector 2 and which emits the dispersed spectral groups to each of two photo-detectors 5 and 6. The photo-detector 5 receives an incident light and detects a specified spectral light band centering on the wavelength $\lambda_a$ (for example, $\lambda_a$=0.85 μm). The photo-detector 6 receives an incident light and detects a specified spectral light band centering on the wavelength $\lambda_b$ (for example, $\lambda_b$=1.0 μm). Accordingly, the photo-detectors 5 and 6 may be structured by a wave band selective filter, photodiode (a Si photodiode or a Ge photodiode may be used depending on the receiving and detecting light band), and a signal amplifier, for example.

The reference numeral 7 is a temperature converter which converts a detected signal at the photo-detector 5 into temperature and generates a indication temperature $T_a$. The reference number 8 is a temperature converter which converts a detected signal at the photo-detector 6 into temperature and generates a indication temperature $T_b$. The photo-detector 5 and the temperature converter 7 structure a No. 1 monochrome radiation thermometer, and the photo-detector 6 and the temperature converter 8 structures a No. 2 monochrome radiation thermometer.

The No. 1 and No. 2 monochrome radiation thermometers in FIG. 1 each receive separately spectral light having a certain band width, do not receive a single spectral light, and use equation (3) and inherent parameters $A_a$, $B_a$, $C_a$, and $A_b$, $B_b$, $C_b$, respectively.

The reference number 9 denotes a calculation section to compute a true temperature. The calculation section 9 calculates the true temperature T of molten steel 15 through a correction calculation based on a specific calculation equation described below by using the two parameters, $A_a$, $B_a$, for temperature conversion inherent to the No. 1 monochrome radiation thermometer, a transmission loss index, $D_a$, of optical filter within the light-receiving and detecting wave band, and the indication temperature, $T_a$, in respect of No. 1 monochrome radiation thermometer and by using the two parameters, $A_b$, $B_b$, for temperature conversion inherent to the No. 2 monochrome radiation thermometer, a transmission loss index, $D_b$, of optical filter within the light-receiving and detecting wave band, and the indication temperature, $T_b$, in respect of No. 2 monochrome radiation thermometer.

Since No. 1 and No. 2 monochrome radiation thermometers in FIG. 1 perform the temperature conversion from a finite band spectral light, the correction equation employed by the calculation section fits the situation.

The reference number 12 denotes an optical fiber feed drum, 13 denotes an optical fiber feed roller, 14 denotes a mold, 15 denotes a molten steel, 16 denotes an immersion nozzle, and 17 denotes powder.

The optical fiber 1 covered with a metallic tube is a quartz fiber for communication use. By applying a metallic tube such as SUS tube as the covering material, the optical fiber 1 covered with metallic tube increases its mechanical strength and allows the immersion into the molten steel 15.

Since the optical fiber 1 covered with metallic tube which is immersed into the molten steel 15 consumes with time in the high temperature environment, a mechanism is prepared for the optical fiber 1 covered with metallic tube which was coiled around the optical fiber feed drum 12 to successively unwind to make-up the consumed length. A thermometer provided with such a mechanism is called a consumable optical fiber thermometer.

Figure 6:
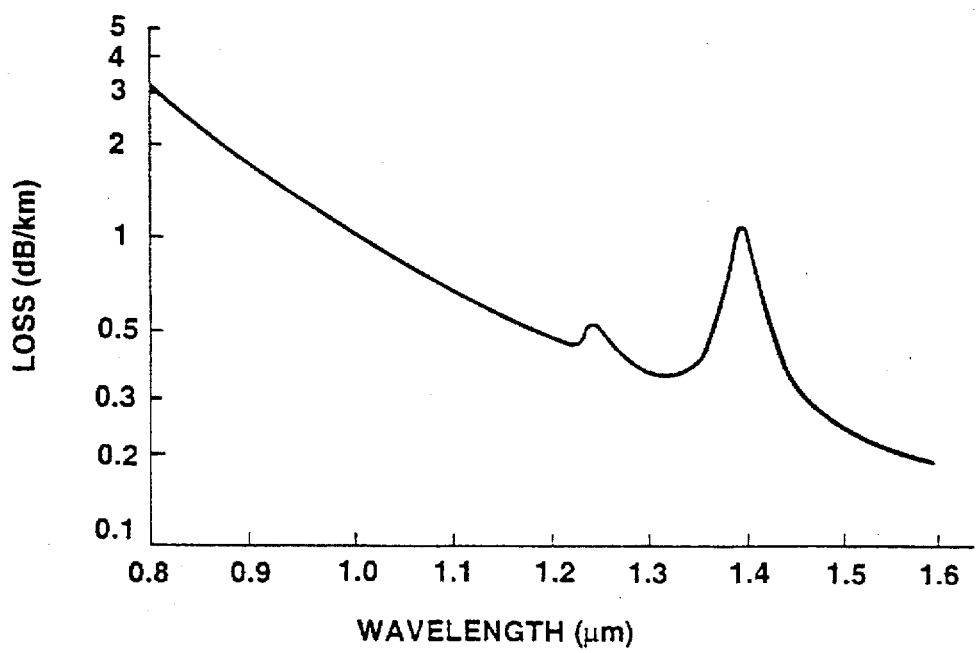
FIG. 6 is a characteristic chart indicating a transmission loss through a quartz optical fiber for communication.
Figure 7:
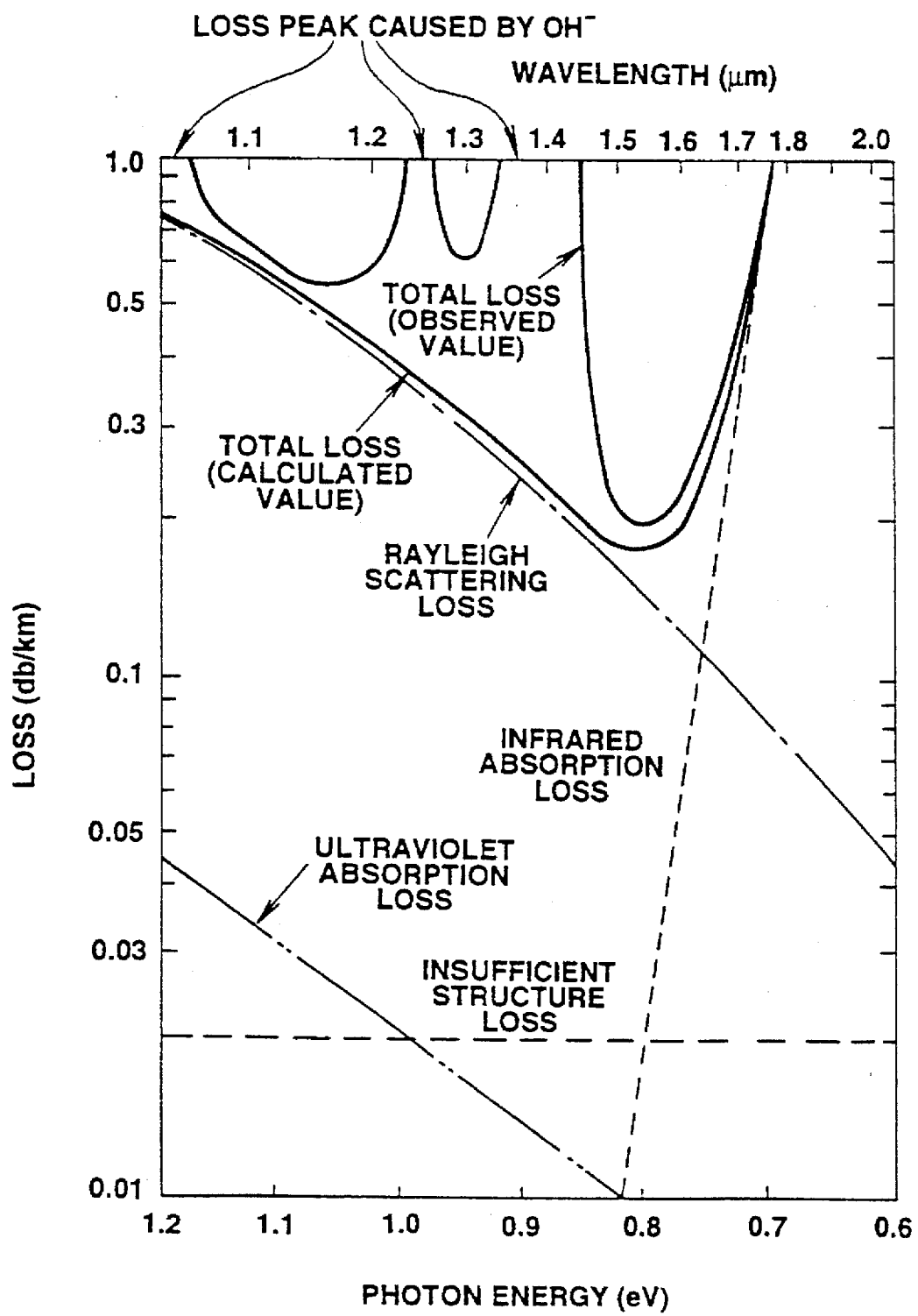
FIG. 7 is another characteristic chart indicating a transmission loss through a quartz optical fiber for communication.

According to the consumable optical fiber thermometer in FIG. 1, the infrared light entered from the tip of the optical fiber attenuates during the transmitting passage until it emits from the other end of the optical fiber owing to the transmission loss. The attenuation characteristics of the optical fiber is a function of wavelength. Although the currently available quartz optical fiber shows significant improvement in its performance, the transmission loss normally gives 2 to 3 dB/km for a normal wavelength of 0.9 μm, and 0.2 to 0.5 dB/km for a wavelength of 1.5 μm. FIG. 6 and FIG. 7 show some of the published observed transmission loss of the optical fiber.

FIG. 6 is a characteristic graph showing a transmission loss of a communication quartz optical fiber (Shimada and Hayashida, "Optical fiber cable" p52, Ohm Co., Ltd., (1987). FIG. 7 is also a characteristic graph showing a transmission loss of a communication quartz optical fiber (Shimada and Hayashida, "Optical fiber cable" p56, Ohm Co., Ltd., (1987).

Both figures suggest that the output of a consumable optical fiber thermometer is affected by the length of fiber. According to an experiment on a black body furnace using a monochrome radiation thermometer with 0.9 μm of wavelength and using a GI fiber (core diameter/clad diameter was 50/125 μm), about +10° C. higher indication was observed at a length of 10 m of the fiber compared with the reference temperature at a length of 100 m.

Accordingly, the consumable optical fiber thermometer of the present invention was developed to maintain an original indication value even when the fiber length becomes short and to enable temperature to be determined with a high accuracy.

Therefore, to eliminate the effect of reduced length of optical fiber, the consumable optical fiber thermometer of FIG. 1 uses two monochrome radiation thermometers which determine finite band width of two different wavelength each other. This system positively uses the principle that the transmission loss of an optical fiber differs in each wavelength.

According to the system, the optical fiber is used as a waveguide which receives a spectral light emitted from molten steel 15 at an end of the optical fiber 1 covered with a metallic tube. At the other end of the optical fiber 1, the transmitted light is dispersed into two spectral groups by a branching filter 4. Each of the dispersed spectral groups is introduced to each of No. 1 and No. 2 monochrome radiation thermometers. The radiation thermometers receive and detect the finite band width of spectral light centering on different wavelength of $\lambda_a$ and $\lambda_b$, respectively, and converts the detected signal into temperature to generate the indication temperature, $T_a$ and $T_b$, respectively.

The procedure to determine the true temperature T from these two indication temperatures, $T_a$ and $T_b$, by the correction calculation in the calculation section 9 is described below.

The indication values of two monochrome radiation thermometers, which values are calibrated by the standard value, give a difference when the fiber length becomes short. The difference between the two values is used to determine the true temperature. The calculation method is as follows.

(1) A correction equation is derived for the case that the relation between the radiation brightness determined by the infrared radiation thermometer and the temperature is expressed by Wien's equation (5). When the response wave band of the light detector of the infrared radiation thermometer is sufficiently narrow and when the response wave band can be treated as a single spectrum, the equation is applicable. The effective wavelength of each of the monochrome radiation thermometer is taken as $\lambda_a$ and $\lambda_b$ (μm).

The thermometer is calibrated when the fiber is at a standard length. The radiation brightness of the light received by each of the monochrome radiation thermometers is taken as $E_a$ and $E_b$. The following Wien's equations (5a) and (5b) are derived.

$$E_a = 2C_a' \times \text{EXP}(-C_2/\lambda_a T)/\lambda_a^5 \quad (5a)$$

$$E_b = 2C_b' \times \text{EXP}(-C_2/\lambda_b T)/\lambda_b^5 \quad (5b)$$

where $C_a'$ and $C_b'$ are constant specific to each radiation thermometer.

The attenuation caused by a light transmission loss through an optical fiber of a length of X is generally expressed by the following equation.

$$R(X) = \text{EXP}(-DX)$$

Therefore, if the length of the optical fiber decreased (consumed) by X from the standard length, the quantity of received light increases by the equal amount to the attenuated quantity. Then, the brightness output $E_a$ and $E_b$ of the monochrome radiation thermometer at that point are written by equations (7) and (8), respectively.

$$E_a = 2C_a' \times \text{EXP}(D_a X) \times \text{EXP}(-C_2/\lambda_a T)/\lambda_a^5 \quad (7)$$

$$E_b = 2C_b' \times \text{EXP}(D_b X) \times \text{EXP}(-C_2/\lambda_b T)/\lambda_b^5 \quad (8)$$

When the temperature indication values at the consumption of X of the optical fiber are taken as $T_a$ and $T_b$, then $E_a$ and $E_b$ are represented by equations (9) and (10).

$$E_a = 2C_a' \times \text{EXP}(-C_2/\lambda_a T_a)/\lambda_a^5 \quad (9)$$

$$E_b = 2C_b' \times \text{EXP}(-C_2/\lambda_b T_b)/\lambda_b^5 \quad (10)$$

The term $E_a$ and $E_b$ are eliminated from equations (7), (8), (9), and (10), and the result is rearranged by logarithmic correlation, so that equations (11) and (12) are derived.

$$D_a X - C_2/\lambda_a T = -C_2/\lambda_a T_a \quad (11)$$

$$D_b X - C_2/\lambda_b T = -C_2/\lambda_b T_b \quad (12)$$

Next, X is eliminated from equations (11) and (12), and the equations are represented in terms of true temperature T to obtain equation (3).

$$T = (1/D_a \lambda_a - 1/D_b \lambda_b)/(1/D_a \lambda_a T_a - 1/D_b \lambda_b T_b) \quad (3)$$

Equation (3) did not use approximation during its derivation, so it eliminates the effect of the fiber length, or eliminate error, and allows the true temperature T to be determined as far as the relation between the radiation brightness which was detected by an infrared radiation thermometer and the true temperature is expressed by Wien's equation.

(2) The next step is to derive a correction equation in the case that the detection wave band of an infrared radiation thermometer has a finite width and that the detection wave band can not be treated as a single spectrum. In this case, the relation between the radiation brightness and the temperature is expressed by equation (6) using A, B, and C constants.

The thermometer is calibrated at the standard fiber length, and the radiation brightness of the light received by the monochrome radiation thermometer at that point is taken as $E_a$ and $E_b$. Then, the constants A, B, and C of each of the radiation thermometers, $A_a$, $B_a$, $C_a$, $A_b$, $B_b$, and $C_b$, are used to express the relation with the true temperature T in equations (6a) and (6b).

$$E_a = C_a \times \text{EXP}\{-C_2/(A_a T + B_a)\} \quad (6a)$$

$$E_b = C_b \times \text{EXP}\{-C_2/(A_b T + B_b)\} \quad (6b)$$

The brightness outputs $E_a$ and $E_b$ of the monochrome radiation thermometer at the reduction (consumption) of the length X from the standard length of the optical fiber are represented by equations (13) and (14), respectively.

$$E_a = C_a \times \text{EXP}(D_a X) \times \text{EXP}\{-C_2/(A_a T + B_a)\} \quad (13)$$

$$E_b = C_b \times \text{EXP}(D_b X) \times \text{EXP}\{-C_2/(A_b T + B_b)\} \quad (14)$$

When the temperature indication values are taken as $T_a$ and $T_b$, the term $E_a$ and $E_b$ can be represented as equations (15) and (16).

$$E_a = C_a \times \text{EXP}\{-C_2/(A_a T_a + B_a)\} \quad (15)$$

$$E_b = C_b \times \text{EXP}\{-C_2/(A_b T_b + B_b)\} \quad (16)$$

Then, $E_a$ and $E_b$ are eliminated from equations (13), (14), (15), and (16), and the result is rearranged by logarithmic relation, equations (17) and (18) are derived.

$$D_a X - C_2/(\lambda_a T + B_a) = -C_2/(\lambda_a T_a + B_a) \quad (17)$$

$$D_b X - C_2/(\lambda_b T + B_b) = -C_2/(\lambda_b T_b + B_b) \quad (18)$$

When X is eliminated from equations (17) and (18), equation (19) is derived.

$$1/D_a(\lambda_a T + B_a) - 1/D_b(\lambda_b T + B_b) = 1/D_a(\lambda_a T_a + B_a) - 1/D_b(\lambda_b T_b + B_b) \quad (19)$$

Equation (19) is solved for the true temperature T to give equation (20).

$$T = \ll -(A_a B_b + A_b B_a) \{-D_a C_2/(A_b T_b + B_b) + \\ D_b C_2/(A_a T_a + B_a)\} + (A_b D_b - A_a D_a)C_2 + \\ [(A_a B_b - A_b B_a)^2 \{-D_a C_2/(A_b T_b + B_b) + \\ D_b C_2/(A_a T_a + B_a)\}^2 + 2C_2(A_a B_b - A_b B_a)(A_a D_a + \\ A_b D_b) \{-D_a C_2/(A_b T_b + B_b) + \\ D_b C_2/(A_a T_a + B_a)\} + (A_a D_a - A_b D_b)^2 C_2^2]^{1/2} \gg / \\ [2 A_a A_b \{-D_a C_2/(A_b T_b + B_b) + D_b C_2/(A_a T_a + B_a)\}] \quad (20)$$

Equation (20) did not use approximation through its derivation, so it eliminates the effect of the fiber length, or eliminates error, and allows true temperature T to be determined as far as the relation between the radiation brightness which was detected by an infrared radiation thermometer and the true temperature is expressed by equation (6).

Since equation (20) is complex and takes time for calculation, an approximation equation which conducts a simple correction is derived. Focusing on the fact that the relation AT>>B generally appears at near 1500° C. of T and 1 to 2 μm of $\lambda$, then the term $[1/(AT+B)]$ can be taken as approximately equal to $[1/AT - B/(AT)^2]$. If the approximation is used, equation (19) is represented as equation (21).

$$(1/T_a - 1/T)/D_a A_a - B_a(1/T_a^2 - 1/T^2)/D_a A_a = (1/T_b - 1/T)/D_b A_b - B_b(1/T_b^2 - 1/T^2)/D_b A_b \quad (21)$$

Furthermore, taking it into account of the relations $[T_a - T \ll T_a]$ and $[T_b - T \ll T_b]$, the value of $(1/T_a + 1/T)$ is approximately equal to $2/T_a$, and the value of $(1/T_b + 1/T)$ is approximately equal to $2/T_b$. By using these approximation relations, equation (21) is written as equation (22).

$$(1/T_a-1/T)(1-2B_a/A_aT_a)D_aA_a=(1/T_b-1/T)(1-2B_b/A_bT_b)D_bA_b \quad (22)$$

When equation (22) is solved for the true temperature T, equation (1) is derived.

$$T=\{(1/D_aA_a-1/D_bA_b)-2(B_a/D_aA_a^2T_a-B_b/D_bA_b^2T_b)\}\div\{(1/D_aA_aT_a-1/D_bA_bT_b)-2(B_a/D_aA_a^2T_a^2-B_b/D_bA_b^2T_b^2)\} \quad (1)$$

The true temperature T after eliminating the effect of an optical fiber length X is determined by calculation from equation (20) or (1) using the indication values $T_a$ and $T_b$ of the two infrared radiation thermometers, each one pair of parameters $A_a$ and $B_a$, and $A_b$ and $B_b$ among the parameters A, B, and C which represent the characteristics of each radiation thermometer, and the transmission loss indexes $D_a$ and $D_b$ at the measuring wavelength of each radiation thermometer.

In the case that data are converted into digital signals and that the digital signal processor (DSP) and the central processing unit (CPU) conduct digital computation, equation (1) can be used as it is. However, in an analog circuit which computes equation(1), the equation is too complex.

In this respect, to simplify the calculation by an analog circuit, the following approximation is further introduced.

If the relations that $\{1/T_a-1/T\}$ is approximately equal to $\{(T-T_a)/T^2\}$, and that $\{1/T_b-1/T\}$ is approximately equal to $\{(T-T_b)/T^2\}$ are applied to equation (22), then equation (22a) is derived.

$$(1-2B_a/A_aT_a)(T-T_a)D_aA_a=(1-2B_b/A_bT_b)(T-T_b)D_bA_b \quad (22a)$$

Equation (22a) is solved for the true temperature T, and equation (23) is derived.

$$T=\{(1-2B_a/A_aT_a)T_a/D_aA-(1-2B_b/A_bT_b)D_bA_b\}\div\{(1-2B_a/A_aT_a)/D_aa_a-(1-2b_b/A_bT_b)/D_bA_b\} \quad (23)$$

Furthermore, the case wherein the temperature range of the target is known in terms of $T_a$ and $T_b$ and wherein the approximate values of indication temperatures, $T_a'$ and $T_b'$ are known has been studied. For example, when the temperature range of a target is known to have a range of from 1400° to 1600° C., the median value of the temperature range, 1500° C., can be set as an approximate value.

In that case, equation (23) can be approximated by equation (2).

$$T=\{(1-2B_a/A_aT_a')T_a/D_aA_a-(1-2B_b/A_bT_b')T_b/D_bA_b\}\div\{(1-2B_a/A_aT_a')/D_aA_a-(1-2B_b/A_bT_b')/D_bA_b\} \quad (2)$$

Since equation (2) is linear for $T_a$ and $T_b$, their coefficients are known and are determined in advance, the computation of equation (2) can be reproduced even with a simple analog circuit.

Figure 2:
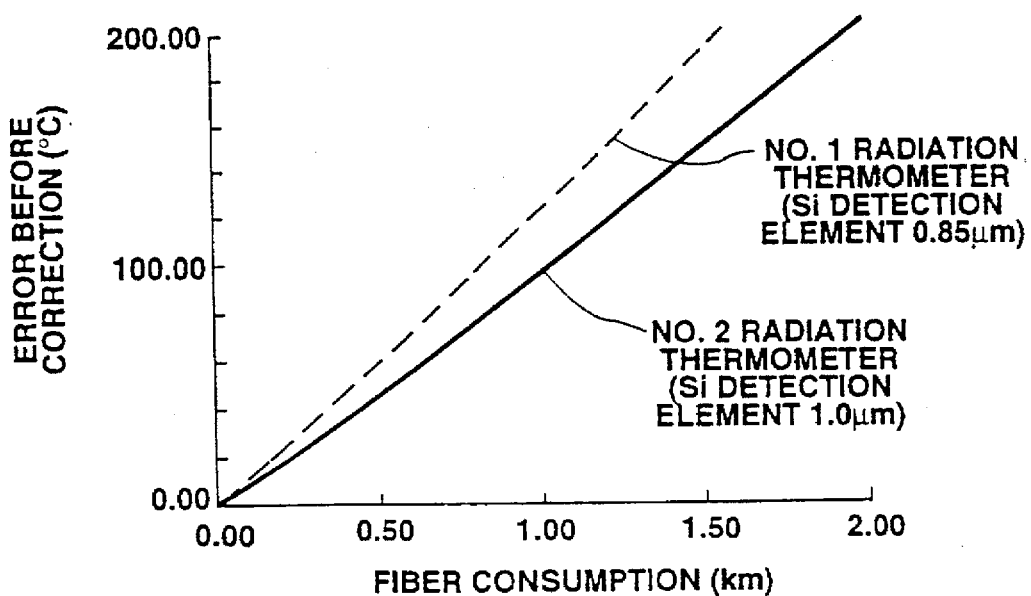
FIG. 2 shows a relation between a fiber consumption and an error before correction.

FIG. 2 shows an indication error caused by the consumption of a fiber length of a radiation thermometer in a temperature measurement. The conditions for observation are given below.

(1) No. 1 monochrome radiation thermometer
Si detector
(finite band width around the central wavelength $\lambda_a$=0.85 µm)
No. 2 monochrome radiation thermometer
Si detector
(finite band width around the central wavelength $\lambda_b$=1.0 µm)

(2) Optical fiber for communication, GI 50/125,
Transmission loss 2.65 dB/km ($\lambda_a$=0.85 µm)
Transmission loss 1.8 dB/km ($\lambda_b$=1.0 µm)
Covering tube:SUS tube, outside diameter 1.2 mm (3) Each thermometer has a finite spectral band width. The parameters representing the characteristics are given below.
No. 1 monochrome thermometer:
$A_a$=8.41×10$^{-7}$
$B_a$=2.98×10$^{-5}$
No. 2 monochrome thermometer:
$A_b$=9.88×10$^{-7}$
$B_b$=1.60×10$^{-5}$ FIG. 2 shows the error of indication value of each monochrome infrared radiation thermometer in the case that the measuring temperature T is 1500° C. and that the fiber consumption length is X (km). The error of No. 1 radiation thermometer (wavelength 0.85 µm) is drawn by broken line, and the error of No. 2 radiation thermometer (wave length 1.0 µm) is drawn by solid line.

FIG. 2 suggests that as-indicated values on the two monochrome radiation thermometers give an indication error of about 100° C. at the fiber consumption of 1 km, and of about 10° C. at the fiber consumption of 100 m.

Figure 3:
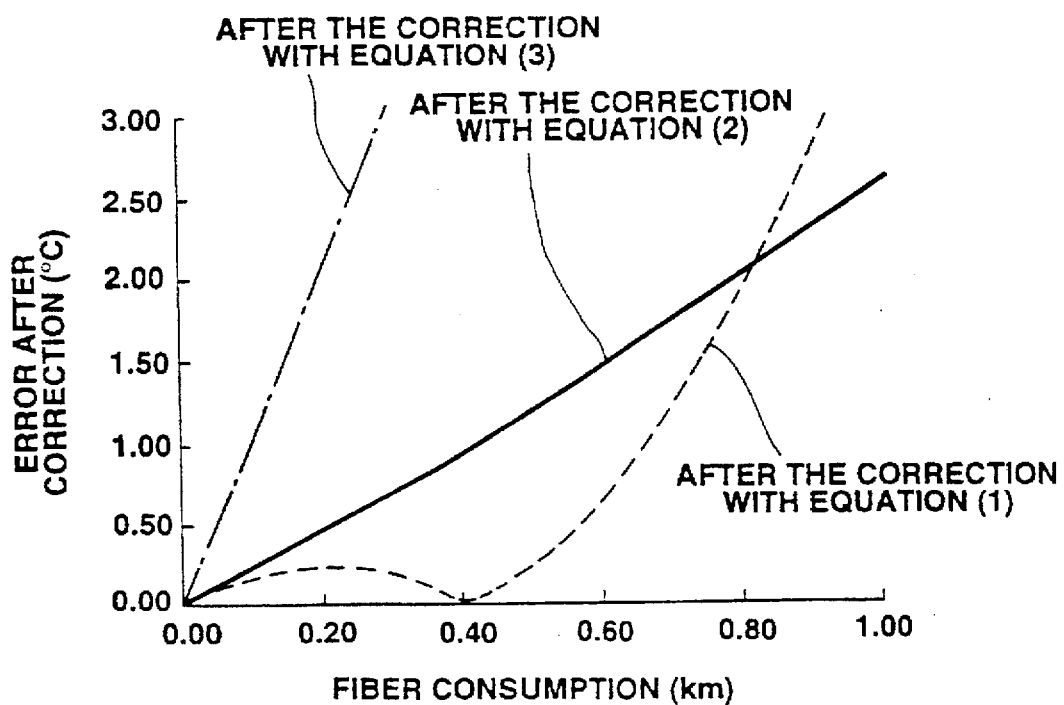
FIG. 3 shows a relation between a fiber consumption and an error after correction.

FIG. 3 shows an example of correction of the error observed in FIG. 2 using a consumable optical fiber thermometer 3 shown in FIG. 1.

FIG. 3 gives an error after correction calculation applied to the observed values in FIG. 2 using the correction equations (1), (2), and (3), respectively.

The chain line in FIG. 3 is for the case that the detection wave band of radiation thermometer is sufficiently narrow and the light is treated as a single spectrum and that equation (3) is applied. In that case, the error within 2° C. after correction can not be attained unless the fiber consumption is at or less than 200 m.

The reason for the error occurrence is as follows. Each of No. 1 and No. 2 radiation thermometers in FIG. 1 receives a spectral light having a finite band width and conducts temperature conversion using a temperature conversion equation which includes inherent parameters $A_a$, $B_a$, $C_a$, and $A_b$, $B_b$, and $C_b$. Nevertheless, the correction equation (3) uses Wien's equation assuming that the radiation thermometer receives a single spectral light. As a result, a mismatch occurs between the temperature conversion and the correction.

On the other hand, an error occurs after the correction using the correction equations (1) and (2) which include the parameters A, B, and C, taking into account of the finite spectral band width. The error for equation (1) and equation (2) is drawn by broken line and solid line, respectively. Both cases show the approximation error of within 2° C. At the fiber consumption of 800 m or less, which error is in a satisfactory range for practical application.

The following is an example of a structure of the consumable optical fiber thermometer which fits the correction equation (3).

Figure 4:
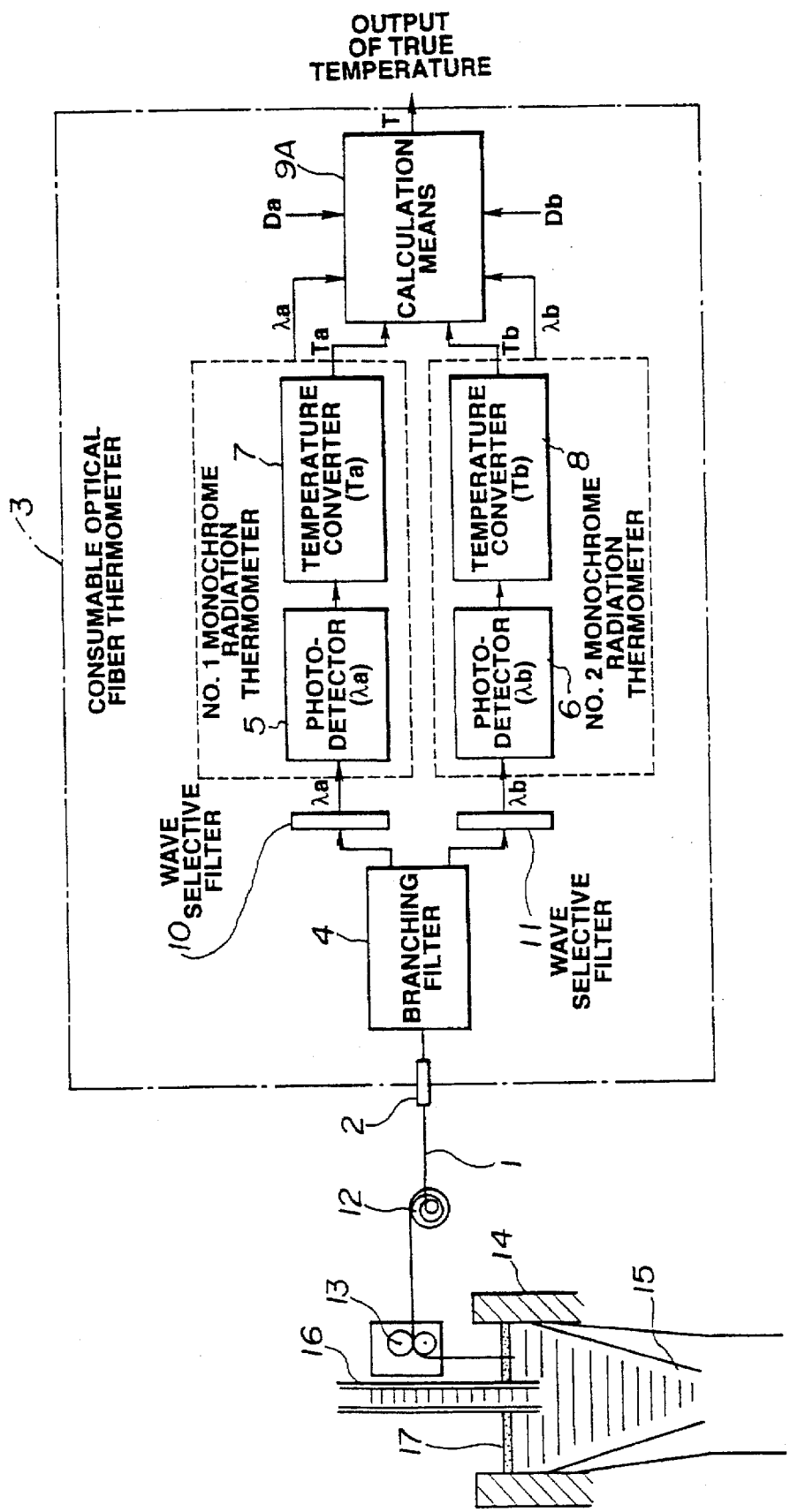
FIG. 4 shows another example of an apparatus for measuring temperature using a consumable optical fiber of the present invention.

FIG. 4 gives Example 2 of a structure of the consumable optical fiber thermometer of the present invention.

There are differences between the structure of FIG. 4 and FIG. 1. The structure of FIG. 4 adds the narrow band wave selective filters 10 and 11 to the consumable optical fiber thermometer 3A, and the temperature converters 7 and 8 are changed just to temperature converters 7A and 8A, and the calculation section 9 is changed just to calculation section 9A.

Both of the narrow band wave selective filters 10 and 11 are positioned before the two photo-detectors 5 and 6. These narrow band wave selective filters 10 and 11 emit lights each having different wavelength, $\lambda_a$ and $\lambda_b$ respectively and having sufficiently narrow spectra to a degree that the light can be handled as a single spectrum into the photo-detectors 5 and 6, respectively.

In that case, therefore, the Wien's equation (5) is acceptable. The temperature converters 7A and 8A conduct temperature conversion based on Wien's equation and generate the indication temperature $T_a$ and $T_b$, respectively.

The calculation section 9A in FIG. 4 can determine the true temperature T of the molten steel 15 using the correction equation (3) by applying the indication temperatures $T_a$ and $T_b$ which are generated from the two radiation thermometers, the receiving and detecting wavelength $\lambda_a$ and $\lambda_b$, and the optical fiber transmission loss $D_a$ and $D_b$ at the wavelength $\lambda_a$ and $\lambda_b$, respectively.

Since the correction equation (3) includes no approximation calculation, the error after correction reduces nearly to zero.

Figure 5:
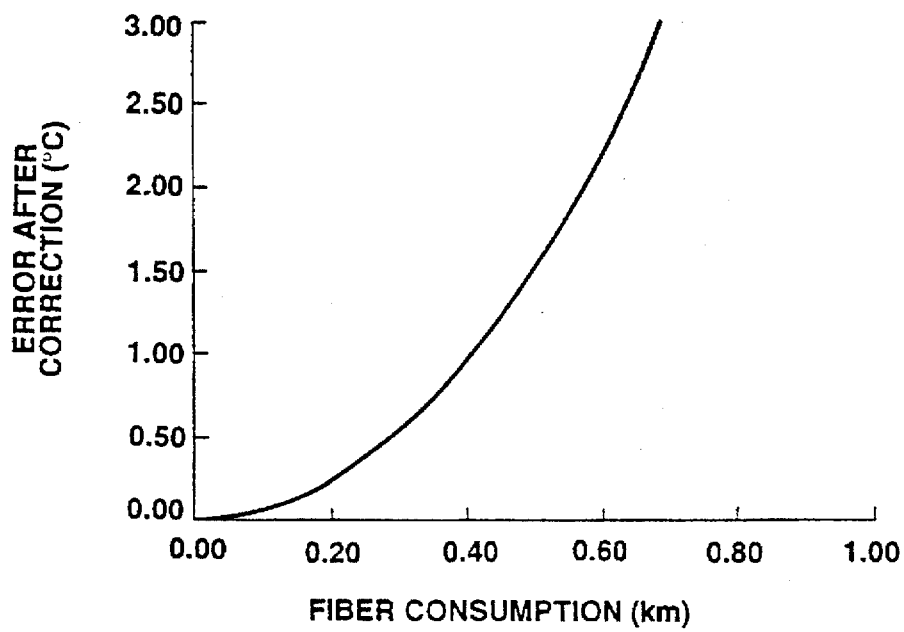
FIG. 5 shows a relation between a fiber consumption and an error after correction according to a conventional art.

To validate the effect of the correction equation (3), FIG. 5 shows an error after correction using the correction equation described in JP-A-142049/93.

FIG. 5 gives a result of conventional correction calculation which was described in JP-A-142049/93, where the error exceeds 2° C. when the fiber consumption exceeds 600 m. The error comes from that the correction equation includes an approximation calculation. The error induced by such an approximation calculation can be completely eliminated by applying equation (3).

As described above, according to the present invention, a consumable optical fiber thermometer receives a radiation light emitted from a high temperature target at an end of the optical fiber and transmits the received radiation light therethrough and determines a temperature of the high temperature target using a radiation thermometer which receives and detects the radiation light emitted from other end of the optical fiber to convert into temperature, wherein the light emitted from the other end of the optical fiber is dispersed into two spectral groups via a branching filter, and each of the spectral groups is introduced into each of the two radiation thermometers. Each of the two radiation thermometers receives and detects light wave band different each other, and converts the detected light into temperature to generate respective indication temperature. A calculation means computes a true temperature of the high temperature target by using each pair of parameters for temperature conversion inherent to each radiation thermometer, a transmission loss information of the optical filter within each light-receiving and detecting wave band, and an indication temperature in each radiation thermometer. Consequently, the configuration enables the elimination of the effect of the decreased fiber length, which effect is the severest problem of the conventional consumable optical fiber thermometer, and enables temperature of a high temperature target such as molten metal to be determined continuously at a high accuracy, high response rate, and low cost instead of the conventional consumable immersion thermometer using thermocouples. In particular, since the economy is improved by enabling the use of a long fiber of around 1 km, and since the maintenance ability is improved by the reduction of calibration work, the application field is significantly broadened. For example, an iron-making process showed a marked effect of improved accuracy of temperature control such as with respect to a converter, an electric furnace, a smelting furnace, and a tundish in continuous casting. In this respect, the industrial value of the present invention is significant.

According to the present invention, the two radiation thermometers determine the indication temperature by using the spectral light having a finite band width around different wavelength for respective thermometer, and the calculation means uses the equation (1) to calculate the true temperature T of a high temperature target. As a result, a high accuracy measurement giving an error of within 2° C. at around 1500° C. of the target is attained with up to 800 m of fiber consumption.

According to the present invention, when the temperature range of the high temperature target is known and when approximate value of the indication temperature of the two radiation thermometers can be set, the calculation means is able to compute the true temperature T of the high temperature target by using equation (2) which is linear to the indication temperature. As a result, a simple analog circuit structures the evaluation means, which provides an instrument which gives a high response rate with high accuracy and at a low cost.

According to the present invention, each of the two radiation thermometers determines indication temperature by using a narrow band width light having different wavelength each other and being acceptable as a single spectral light, and the calculation means computes the true temperature T of a high temperature target by using equation (3) which is a simple calculation equation and which does not contain approximation computation. As a result, a simple and inexpensive instrument performs high accuracy temperature determination.

EMBODIMENT-2

According to another method for measuring temperature of the present invention, a consumable optical fiber also is used. A light emitted from a high temperature liquid is received at an end of the consumable optical fiber. The received light is transmitted through the consumable optical fiber to the other end of the consumable optical fiber. The received light is filtered by a wave selective filter to pass solely a narrow band spectral light having a predetermined central wavelength. The narrow band spectral light is converted into temperature by a radiation thermometer.

The central wavelength of the narrow band spectral light is preferred to be 1.55 µm or to be near 1.55 µm. Furthermore, the wave selective filter is preferred to have a transmission band of ±0.1 µm to the central wavelength. The radiation thermometer has a InGaAs photodiode as a receiving and detecting device.

As for still another method for measuring temperature, a consumable optical fiber is also used. A light emitted from a high temperature liquid is received at an end of the consumable optical fiber. The received light is transmitted through the consumable optical fiber to the other end of the consumable optical fiber. The received light is divided through a branching filter into two light beams, i.e. a first light beam and a second light beam. The first light beam is filtered by a first wave selective filter to pass solely a first spectral light of a first wave band having a predetermined central wavelength. The passed spectral light is received and detected by a first radiation thermometer and converted into temperature. The second light beam is filtered by a second wave selective filter to pass solely a second spectral light of a second wave band having a predetermined central wavelength. The second spectral light is detected by a second radiation thermometer and is converted into temperature. A true temperature T is calculated by using temperature conversion parameters inherent to the first radiation thermometer and the second radiation thermometer respectively, transmission loss informations of the optical fiber regarding to the first spectral light and the second spectral light, and the temperature $T_a$, $T_b$, respectively outputted from the first radiation thermometer and the second radiation thermometer.

The first spectral light of the first wave band filtered by the first wave selective filter and the second spectral light of the second wave band filtered by the second wave selective filter are different each other in respect of the wavelength. The central wavelength of the narrow band spectral light is preferred to be 1.55 μm or to be near 1.85 μm. Furthermore, the wave selective filter is preferred to have a transmission band of ±0.1 μm to the central wavelength. The first radiation thermometer has an InGas photodiode as a light receiving and detecting device. The second radiation thermometer has a Si photodiode as a light receiving and detecting device.

EXAMPLE-2

First, the sensitive characteristics of a radiation thermometer taking into account the attenuation of the optical fiber are described below. The spectral radiation brightness L ($\lambda$, T) of a black body is expressed by equation (24) based on Plank's law.

$$L(\lambda,T)=2C_1/\{\lambda^5 \times (\text{EXP}(C_2/\lambda T)-1)\} \quad (24)$$

where $\lambda$: wavelength

T: absolute temperature (K)

$C_1$: $5.9548 \times 10^{-7}$ W·m$^2$ $C_2$: 0.014388 m·K

Equation (24) is approximated by Wien's equation (25) within a range of $\lambda T \leq \lambda_m T$, ($\lambda_m T = 2.8978 \times 10^{-3}$ m·K).

$$L(\lambda,T)=2C_1 \times \text{EXP}(-C_2/\lambda T)/\lambda^5 \quad (25)$$

In an ordinary radiation thermometer, the brightness signals are converted to temperature by using an approximation equation (26) which uses coefficients A, B, and C which were determined by experiments in accordance with JIS (refer to "New temperature measurement" p286, instrumentation and Automatic Control Academy).

$$L(\lambda,T)=C \times \text{EXP}\{-C_2/(AT+B)\} \quad (26)$$

Figure 8:
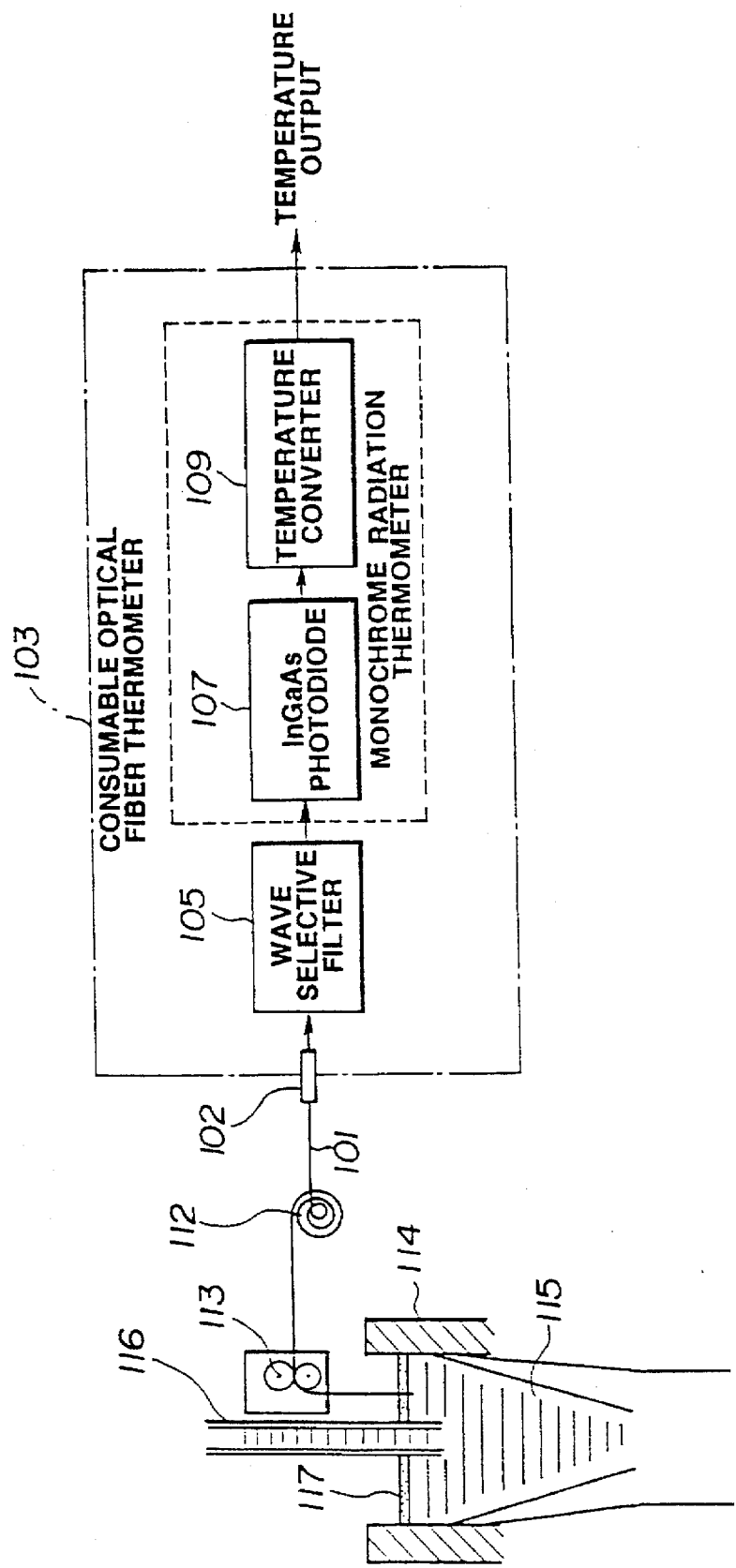
FIG. 8 shows another example of an apparatus for measuring temperature using a consumable optical fiber of the present invention.

FIG. 8 shows an example of an apparatus for measuring temperature using a consumable optical fiber of the present invention. In FIG. 8, the reference numeral 101 denotes an optical fiber covered with a metallic tube, 102 denotes an optical connector, 103 denotes a consumable optical fiber thermometer which includes a narrow band wave selective filter 105, a photodiode 107, and a temperature converter 109.

The narrow band wave selective filter 105 is structured by an interference filter, for example, and allows to transmit a specified wave band (1.55±0.025 μm in this example) using an interference of light induced by a thin film. The photodiode 107 uses that of an InGaAs device in this example and receives and detects the light of 1.55±0.025 μm wave band which was transmitted through the narrow hand wave selective filter 105.

The temperature converter 109 converts the output signal which is received and detected by the InGaAs photodiode 107 into temperature and generates the indication temperature T. In the mode of FIG. 8, since the indication temperature T is used in as-converted state (or no correction computation is applied), the temperature converter 109 my use either one of equation (25) and equation (26).

The photodiode 107 and the temperature converter 109 structure a monochrome radiation thermometer.

The reference numeral 112 denotes an optical fiber feed drum, 113 denotes an optical fiber feed roller, 114 denotes a mold, 115 denotes a molten steel, 116 denotes an immersion nozzle, and 117 denotes powder.

The optical fiber of the optical fiber 101 covered with a metallic tube is a quartz fiber For communication use. By applying a metallic tube such as SUS tube as the covering material, the optical fiber 101 covered with metallic tube which is used as a sensor increases its mechanical strength and allows the immersion into the molten steel 115.

Since the optical fiber 101 covered with metallic tube which is immersed into the molten steel 115 consumes with time in the high temperature environment, a mechanism is prepared For the optical fiber 101 covered with metallic tube which was coiled around the optical fiber feed drum 112 to successively unwind to make-up the consumed length. The thermometer provided with the mechanism is called the consumable optical fiber thermometer.

FIG. 8 uses only a single wave band for temperature measurement, so the thermometer is called the consumable optical fiber thermometer of single wavelength.

According to the consumable optical fiber thermometer in FIG. 8, the infrared light entered from the tip of the optical fiber attenuates during the transmitting passage until it emits from the other end of the optical fiber owing to the transmission loss. The attenuation characteristics of the optical fiber is a function of wavelength. Although the currently available quartz optical fiber shows significant improvement in its performance, the transmission loss normally gives 2 to 3 dB/km for a normal wavelength of 0.9 μm, and 0.2 to 0.5 dB/km for a wavelength of 1.5 μm. FIG. 6 and FIG. 7 show some of the published observed transmission loss in the optical fiber.

Both figures suggest that the output of a consumable optical fiber thermometer is affected by the length of fiber. According to an experiment on a black body furnace using a monochrome radiation thermometer with 0.9 μm of wavelength and using a GI fiber (core diameter/clad diameter was 50/125 μm), about 10° C. higher indication was observed at a length of 10 m of the fiber compared with the reference temperature at a length of 100 m.

Accordingly, the consumable optical fiber thermometer of this invention was developed to maintain an original indication value even when the fiber length becomes short and to enable to determine a high accuracy temperature.

Referring to FIG. 8, the temperature calibration is carried out when the length of the optical fiber 101 covered with metallic tube is the reference fiber length, and the radiation brightness of the light received by the monochrome radiation thermometer is taken as E, then E is expressed by Wien's equation (25A).

$$E=2C \times \text{EXP}(-C_2/\lambda T)/\lambda^5 \quad (25A)$$

where C' is a constant specific to each thermometer.

Generally, the attenuation by light transmission loss at a fiber length of X is represented in the following equation.

$$R(X)=\text{EXP}(-DX)$$

Therefore, when the length of an optical fiber decreases (consumes) by X from the reference length, the receiving light increases by the amount equal to the above-described attenuation. The brightness output E' of the monochrome radiation thermometer at that time is written by equation (25B).

$$E'=2C'\times EXP(DX)\times EXP(-C_2/\lambda T)/\lambda^5 \quad (25B)$$

If the temperature indication value at the time when the optical fiber consumes by X is designates as T', then the E' is written by equation (25C).

$$E'=2C'\times EXP(-C_2/\lambda T')/\lambda^5 \quad (25C)$$

Consequently, the temperature indication value T in equation (25A) at the thermometer calibration and the temperature indication value T' in equation (25C) when the optical fiber consumes do not agree each other, and the difference of $\Delta T=T'-T$ becomes the indication error.

The attenuation characteristics of an optical fiber are a function of wavelength. As seen in FIG. 6 and FIG. 7, generally the longer wavelength gives less attenuation. Nevertheless, the attenuation increases at near 1.4 μm owing to the OH group absorption band.

Since the Ge photodiode has a broad sensitive wave band ranging from 0.8 to 1.8 μm, a Ge radiation thermometer can not give a stable indication because the thermometer is exposed to a high temperature during calibration and the fiber tip alters its quality caused by the penetrated hydrogen atoms, and because the transmission loss D increases in the OH group absorption band at 1.4 μm.

On the other hand, the consumable optical fiber radiation thermometer 103 in FIG. 8 has a narrow band wave selective filter 105 which allows to transmit light of only the central wavelength of 1.55±0.025 μm at the incident plane of the InGaAs photodiode 107. Owing to the wave band which does not receive the effect of 1.4 μm absorption band, the value of transmission loss index D of the optical fiber is as low as about 0.3 dB/km.

Accordingly, when the temperature to be determined is 1500° C. the fiber consumption of 100 m accompanies only 2° to 3° C. of rise in indication value.

In addition, since no OH group absorption band is included, there is no instability of temperature indication value which may generate in a Ge radiation thermometer.

Furthermore, since the detection device uses an InGaAs photodiode 107, even when the quantity of detection light decreases by passing through the narrow band wave selective filter 105, the light does not mix in a dark current and allows fop detecting the light quantity at a good S/N ratio.

Figure 9:
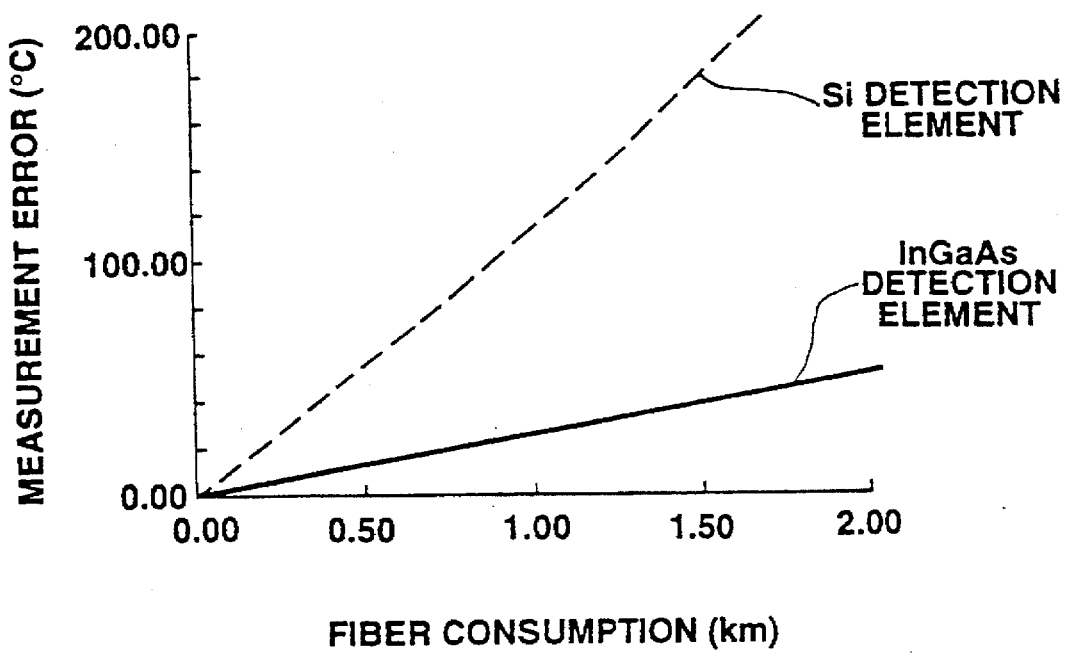
FIG. 9 shows a relation between a fiber consumption and an error according to the present invention.

FIG. 9 shows a result of observation using the consumable optical fiber thermometer of FIG. 8.

The solid line of FIG. 9 indicates the case that an InGaAs photodiode is used. The broken line indicates the case that a Si photodiode is used as a comparison.

In FIG. 9, the metallic tube of the optical fiber 101 covered with a metallic tube is made of SUS having a diameter of 1.2 mm, and the optical fiber is made of a communication quartz fiber with GI fiber (core diameter/clad diameter is 50/125 μm). The transmission wave band of the narrow band wave selective filter 105 is 1.55±0.025 μm.

The solid line of FIG. 9 gives about 25° C. of measurement error even when the fiber consumption reaches 1 km.

When a consumable optical fiber thermometer having the structure of FIG. 8 is used, if the consumption of the optical fiber is within 100 m from the point of calibration, then the temperature measurement at an accuracy of ±2° C. is always possible. Therefore, the fiber may be replaced with that having a standard length at every 100 m consumption.

For an intermittent temperature measurement, a consumable optical fiber thermometer usually consumes about 40 to 50 mm in every measurement. Then, even in the case that the frequency of measurement is selected as three times an hour, or 3×24=72 times a day, one drum of 100 m fiber is possible to continuously determine the temperature for about one month (72×30=216 times of measurement).

As a result, the consumable optical fiber thermometer using a single wavelength having a structure of FIG. 8 raises no problem of accuracy and is used in practical application without giving a correction calculation.

FIG. 8 illustrates a consumable optical fiber thermometer using a single wavelength without applying correction calculation. The following is the description of a measuring method using two wavelengths and giving a correction calculation on fiber length.

In the method of fiber length correction with two wavelengths, the radiated light entering from the tip of the optical fiber is dispersed into two spectral groups. Each of the groups is introduced into separate monochrome radiation thermometer having different detection wave band, and the two indication temperatures $T_a$ and $T_b$ re determined. A correction calculation is applied to $T_a$ and $T_b$ to determine the true temperature T. The procedure of determination is described below.

The indication values of two monochrome radiation thermometers, which values are calibrated by the standard value, give a difference when the fiber length becomes short. The difference between the two values is used to determine the true temperature. The calculation method is as follows.

(1) A correction equation is derived for the case that the relation between the radiation brightness determined by the infrared radiation thermometer and the temperature is expressed by the Wien's equation (25). When the response wave band of the light detector of the infrared radiation thermometer is sufficiently narrow and when the response wave band can be treated as a single spectrum, the equation is applicable. The effective wavelength of each of the monochrome radiation thermometer is taken as $\lambda_a$ and $\lambda_b$ (μm).

The thermometer is calibrated when the fiber is at a standard length. The radiation brightness of the light received by each of the monochrome radiation thermometers is taken as $E_a$ and $E_b$. The following Wien's equations (25a) and (25b) are derived.

$$E_a=2C_a'\times EXP(-C_2/\lambda_a T)/\lambda_a^5 \quad (25a)$$

$$E_b=2C_b'\times EXP(-C_2/\lambda_b T)/\lambda_b^5 \quad (25b)$$

where $C_a'$ and $C_b'$ are constant specific to each radiation thermoer.

If the optical fiber loses (consumes) its length by X from the standard length, the quantity of light increases by the amount equal to $R(X)=EXP(-DX)$, or the light transmission loss at a length X. The brightness output $E_a$ and $E_b$ of the monochrome radiation thermometer at that point are written by equations (27) and (28), respectively.

$$E_a=2C_a'\times EXP(D_a X)\times EXP(-C_2/\lambda_a T)/\lambda_a^5 \quad (27)$$

$$E_b=2C_b'\times EXP(D_b X)\times EXP(-C_2/\lambda_b T)/\lambda_b^5 \quad (28)$$

When the temperature indication values at the consumption of X of optical fiber are taken as $T_a$ and $T_b$, then $E_a$ and $E_b$ are written by equations (29) and (30).

$$E_a=2C_a'\times EXP(-C_2/\lambda_a T_a)/\lambda_a^5 \quad (29)$$

$$E_b=2C_b'\times EXP(-C_2/\lambda_b T_b)/\lambda_b^5 \quad (30)$$

The term $E_a$ and $E_b$ are eliminated from equations (27), (28), (29), and (30), and the result is rearranged by logarithmic correlation, equations (31) and (32) are derived.

$$D_a X - C_2/\lambda_a T = -C_2/\lambda_a T_a \qquad (31)$$

$$D_b X - C_2/\lambda_b T = -C_2/\lambda_b T_b \qquad (32)$$

Then, X is eliminated from equations (31) and (32), and the equations are rewritten in terms of true temperature T to obtain equation (33).

$$T = (1/D_a\lambda_a - 1/D_b\lambda_b)/(1/D_a\lambda_a T_a - 1/D_b\lambda_b T_b) \qquad (33)$$

Equation (33) does not use approximation through its derivation, so it eliminates the effect of fiber length, or eliminate error, and allows to determine the true temperature T as far as the relation between the radiation brightness which was detected by an infrared radiation thermometer and the true temperature is expressed by Wien's equation.

(2) Next step is to derive a correction equation in the case that the detection wave band of an infrared radiation thermometer has a finite width and that the detection wave band can not be treated as a single spectrum. In this case, the relation between the radiation brightness and the temperature is expressed by equation (26) using A, B, and C constants.

The thermometer is calibrated at the standard fiber length, and the radiation brightness of the light received by the monochrome radiation thermometer at that point is taken as $E_a$ and $E_b$. Then, the constants A, B, and C of each of the radiation thermometers, $A_a$, $B_a$, $C_a$, and $A_b$, $B_b$, $C_b$, are used to express the relation with the true temperature T in equation (26a) and (26b).

$$E_a = C_a \times \text{EXP}\{-C_2/(A_a T + B_a)\} \qquad (26a)$$

$$E_b = C_b \times \text{EXP}\{-C_2/(A_b T + B_b)\} \qquad (26b)$$

The brightness output $E_a$ and $E_b$ of the monochrome radiation thermometer at the reduction (consumption) of the length X from the standard length of the optical fiber are represented by equations (34) and (35), respectively.

$$E_a = C_a \times \text{EXP}(D_a X) \times \text{EXP}\{-C_2/(A_a T + B_a)\} \qquad (34)$$

$$E_b = C_b \times \text{EXP}(D_b X) \times \text{EXP}\{-C_2/(A_b T + B_b)\} \qquad (35)$$

When the temperature indication value is taken as $T_a$ and $T_b$, the term $E_a$ and $E_b$ can be represented as equations (36) and (37).

$$E_a = C_a \times \text{EXP}\{-C_2/(A_a T_a + B_a)\} \qquad (36)$$

$$E_a = C_b \times \text{EXP}\{-C_2/(A_b T_b + B_b)\} \qquad (37)$$

Then, $E_a$ and $E_b$ are eliminated from equations (34), (35), (36), and (37), and the results are rearranged by logarithmic relation, equations (38) and (39) are derived.

$$D_a X - C_2/(\lambda_a T + B_a) = -C_2/(\lambda_a T_a + B_a) \qquad (38)$$

$$D_b X - C_2/(\lambda_b T + B_b) = -C_2/(\lambda_b T_b + B_b) \qquad (39)$$

When X is eliminated from equations (38) and (39), equations (40) are derived.

$$1/D_a(\lambda_a T + B_a) - 1/D_b(\lambda_b T + B_b) = 1/D_a(\lambda_a T_a + B_a) - 1/D_b(\lambda_b T_b + B_b) \qquad (40)$$

Equation (40) is solved for the true temperature T to give equation (41).

$$T = \ll -(A_a B_b + A_b B_a) \{-D_a C_2/(A_b T_b + B_b) + D_b C_2/(A_a T_a + B_a)\} + (A_b D_b - A_a D_a) C_2 + \qquad (41)$$

-continued
$$[(A_a B_b - A_b B_a)^2 \{-D_a C_2/(A_b T_b + B_b) + D_b C_2/(A_a T_a + B_a)\}^2 + 2C_2(A_a B_b - A_b B_a)(A_a D_a + A_b D_b)\{-D_a C_2/(A_b T_b + B_b) + D_b C_2/(A_a T_a + B_a)\} + (A_a D_a - A_b D_b)^2 C_2^2]^{1/2} \gg /$$
$$[2A_a A_b\{-D_a C_2/(A_b T_b + B_b) + D_b C_2/(A_a T_a + B_a)\}]$$

Equation (41) does not use approximation through its derivation, so it eliminates the effect of the fiber length free from error and allows to determine the true temperature T as far as the relation between the radiation brightness which was detected by an infrared radiation thermometer and the true temperature is expressed by equation (26).

Since equation (41) is complex and takes a time for calculation, an approximation equation which conducts a simple correction is derived. Focusing on the fact that the relation AT>>B generally appears at near 1500° C. of T and 1 to 2 μm of λ, then the term $[1/(AT+B)]$ can be taken as approximately equal to $[1/AT - B/(AT)^2]$. If the approximation is used, equation (40) is represented as equation (42).

$$(1/T_a - 1/T)/D_a A_a - B_a(1/T_a^2 - 1/T^2)/D_a A = (1/T_b - 1/T)/D_b A_b - B_b(1/T_b^2 - 1/T^2)/D_b A_b \qquad (42)$$

Furthermore, taking into account of the relation [Ta−T<<Ta] and [Tb−T<<Tb], the value of $(1/T_a + 1/T)$ is approximately equal to $2/T_a$, and the value of $(1/Tb + 1/T)$ is approximately equal to $2/T_b$. By using these approximation relations, equation (42) is represented as equation (43).

$$(1/T_a - 1/T)(1 - 2B_a/A_a T_a)/D_a A_a = (1/T_b - 1/T)(1 - 2B_b/A_b T_b)/D_b A_b \qquad (43)$$

When equation (43) is solved for the true temperature T, equation (44) is derived.

$$T = \{(1/D_a A_a - 1/D_b A_b) - 2(B_a/D_a A_a^2 T_a - B_b/D_b A_b^2 T_b)\} \div (1/D_a A_a T_a - 1/D_a A_a T_a - 1/D_b A_b T_b) - 2(B_a/D_a A_a^2 T_a^2 - B_b/D_b A_b^2 T_b^2) \qquad (44)$$

The true temperature T after eliminating the effect of the optical fiber length X is determined by calculation from equation (41) or (44) using the indication values $T_a$ and $T_b$ of the two infrared radiation thermometers, each one pair of parameters $A_a$ and $B_a$, and $A_b$ and $B_b$ among the parameters A, B, and C which represent the characteristics of each radiation thermometer, and the transmission loss coefficients $D_a$ and $D_b$ at the measuring wavelength of each radiation thermometer.

In the case that data are converted into digital signals and that the digital signal processor (DSP) and the central processing unit (CPU) conduct digital computation, equation (44) can be used as it is. However, in an analog circuit which computes equation (44), the equation is too complex.

In this respect, to simplify the calculation by an analog circuit, the following approximation is further introduced.

If the relations that $\{1/T_a - 1/T\}$ is approximately equal to $\{(T-T_a)/T^2\}$, and that $\{1/T_b 1/T\}$ is approximately equal to $\{(T-T_b)/T^2\}$ are applied to equation (43), then equation (43a) is derived.

$$(1 - 2B_a/A_a T_a)(T - T_a)/D_a A_a = (1 - 2B_b/A_b T_b)(T - T_b)/D_b A_b \qquad (43a)$$

Equation (43a) is solved for the true temperature T, and equation (45) is derived.

$$T = \{(1 - 2B_a/A_a T_a) T_a/D_a A_a - (1 - 2B_b/A_b T_b) T_b/D_b A_b\} \div \{(1 - 2B_a/A_a T_a)/D_a A_a - (1 - 2B_b/A_b T_b)/D_b A_b\} \qquad (45)$$

Furthermore, the case that the temperature range of the target is known in terms of $T_a$, and $T_b$ and that the approximate value of indication temperature, $T_a'$ and $T_b'$ are known is studied. For example, when the temperature range of a target is known to have a range of from 1400° to 1600° C., the median value of the temperature range, 1500° C., can be set as an approximate value.

In that case, equation (45) can be approximated by equation (46).

$$T=\{(1-2B_a/A_aT_a')T_a/D_aA_a-(1-2B_b/A_bT_b')T_b/D_bA_b\}\div\{(1-2B_a/A_aT_a')/D_aA_a-(1-2B_b/A_bT_b')/D_bA_b\} \quad (46)$$

Since equation (46) is linear for $T_a$ and $T_b$ and since their coefficients are known and are determined in advance, the computation of equation (46) can be reproduced even with a simple analog circuit.

The next step is to determine how much error of temperature indication value and of parameter reflect to the estimated value of true temperature.

For example, consider the case that the detected spectra of two infrared radiation thermometers can be treated as a single spectrum. The indication values, $T_a$ and $T_b$, of the two thermometers, the effective wavelengths, $\lambda_a$ and $\lambda_b$, of each of the infrared radiation thermometers, and the transmission loss coefficient, $D_a$ and $D_b$, of the optical fiber at the effective wavelength are used to determine the true temperature T at the tip of the fiber using equation (33). If the values of T, $T_a$, and $T_b$ are approximated to nearly equal value each other, then the error dT of the estimated value of true temperature T is given by equation (47).

$$dT=\{XT^2(dD_a/D_a-dD_b/D_b)/C^230\ dT_a/(D_a\lambda_a)-dT_b/(D_b\lambda_b)\}\div\{1/(D_a\lambda_a)-1/(D_b\lambda_b)\} \quad (47)$$

The next step is to compare the case (A) where both of the two radiation thermometers use Si radiation thermometer and the case (B) where one of the two radiation thermometers uses an InGaAs radiation thermometer and the other uses a Si radiation thermometer, in terms of the magnitude of error dT of the true temperature T indicated by equation (47).

(A) In the case that both of the two radiation thermometers use Si radiation thermometer, the dT of equation (47) is evaluated under the condition that Si photodiode is used to the detection device on both infrared radiation thermometers and that the two different wavelengths are taken as $\lambda_a=0.85$ μm and $\lambda_b=1.0$ μm.

When the transmission loss index uses the observed values $D_a=2.6$ dB/km and $D_b=1.8$ dB/km and when the values of $\lambda_a$, $\lambda_b$, $D_a$, and $D_b$ are put into equation (47) under a condition of T=1500° C. and a fiber length of 1 km, then dT is represented by equation (48).

$$dT=-490(dD_a/D_a-dD_b/D_b)-4.4\ dT_a+5.4\ dT_b \quad (48)$$

In equation (48), the indication value noise on the two infrared radiation temperatures and the measured temperature error $dT_a$ and $dT_b$ are amplified to about five fold, and the sign is reversed each other. Accordingly, if both $dT_a$ and $dT_b$ have the same polarity, then the values cancel each other. If, however, they have different polarity, then the values are added. When the values of transmission loss $D_a$ and $D_b$ are not accurate and when they have an error of 1%, for example, the true temperature T has about 5° C. of the temperature error.

Consequently, in the case of (A), even when the accuracy of the two monochrome radiation thermometers is ±2° C., the accuracy of temperature indication value after correcting the fiber length may degrade up to ±10° C. in the worst case. Since the effect of the error which is included in the transmission loss $D_a$ and $D_b$ is significant, an accurate value of transmission loss in each observed wave band of the optical fiber is necessary.

(B) The case that one of the two radiation thermometers uses an InGaAs radiation thermometer and the other uses a Si radiation thermometer is studied next. As an example, one of the two radiation thermometers uses a monochrome radiation thermometer shown in FIG. 8, where the light receiving device is an InGaAs photodiode and where a narrow band wave selective filter having the central wavelength of 1.55 μm is mounted on the light-receiving plane, and the other radiation thermometer uses an Si photodiode. The indication values $T_a$ and $T_b$ of these two radiation thermometers are entered into a correction calculator to determine T using equation (33).

When $\lambda_a=0.9$ μm, $\lambda_b=1.55$ μm, $D_a=2.2$ dB/km, and $D_b=0.3$ dB/km are put into equation (47), dT is represented by equation (49) under the condition of T=1500° C. and X=1 km.

$$dT=-30(dD_a/D_a-dD_b/D_b)-0.3\ dT_a+1.3\ dT_b \quad (49)$$

In equation (49), the error of observed temperature, $dT_b$, of the InGaAs radiation thermometer is reflected to dT with very little amplification, and the error of observed temperature, $dT_a$, of the Si radiation thermometer affect very little to the estimation error of the true temperature. Even if the error of transmission loss D is 5%, the resulted error of T is only 1.5° C. Therefore, in the case of (B), when the accuracy of the two radiation thermometers is ±2° C., the accuracy after a correction calculation is within ±3° C.

Furthermore, since no accurate values of transmission loss $D_a$ and $D_b$ are requested, the observed values taken from a catalogue or OTDR (optical pulse tester) can be used, which significantly simplifies the calibration work.

When the accuracy of the true temperature after correction calculation is compared between the case (A) and (B), the case (B) is superior to the case (A) as the two radiation thermometer system.

In the case that the detection spectra of the radiation thermometer has a finite band and when the equation (26) is applicable instead of the Wien's equation (25), a correction calculation equation different from equation (33) is necessary, for example equations (44) and equation (46). The accuracy of the true temperature after correction calculation in that case is also better in the case (B) than in the case (A).

Figure 10:
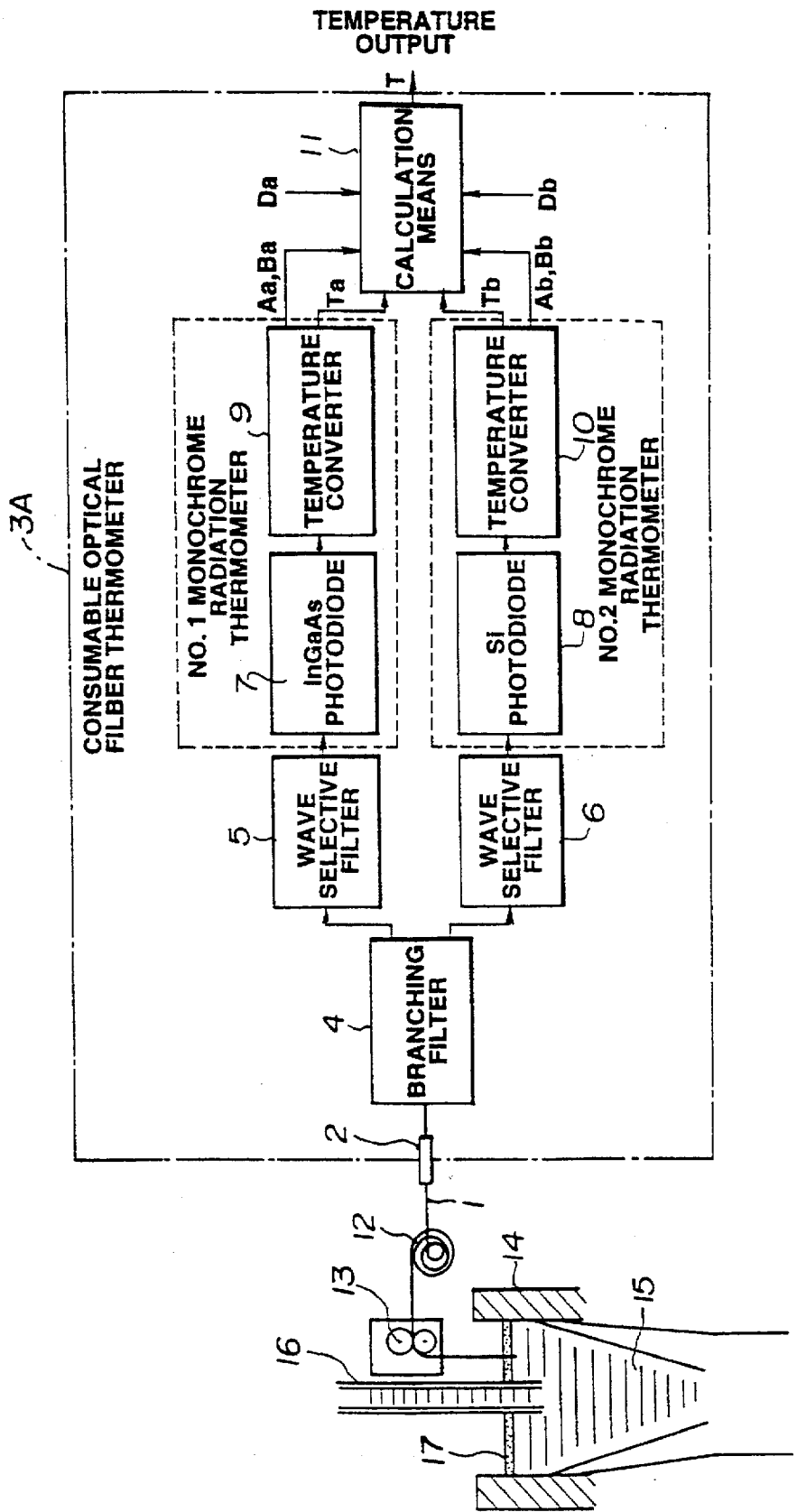
FIG. 10 shows another example of an apparatus for measuring temperature using a consumable optical fiber of the present invention.

FIG. 10 is a figure showing another example structure of the consumable optical fiber thermometer of the present invention.

In FIG. 10, the reference numbers 101, 102, 105, 107, 109, and 112 through 117 denote the same as in FIG. 8. The reference number 3A is a consumable optical fiber thermometer including No. 1 and No. 2 monochrome radiation thermometers which perform temperature measurement at two different wavelengths and including a calculating section 111 which conducts correction calculation.

The reference number 104 denotes a branching filter such as a beam splitter, which disperses a light emitted from an end of the optical fiber 101 covered with metallic tube via a light connector 102 into two spectral groups. One spectral light of the two spectral group is emitted to the narrow band wave selective filter 105 and the other spectral light is emitted to the wave band selective filter 106. The narrow band wave selective filter 105 is the same as shown in FIG. 8, which transmits a narrow band light of the wavelength of 1.55±0.025 μm to the InGaAs photodiode 107. The wave band selective filter 106 is structured by a color glass wave selective filter which, for example, transmits a band light of the wavelength ranging from 0.7 to 1.1 μm to the Si photodiode 108. The reference numbers 109 and 110 are the temperature converters which receive the detection signals of the photodiodes 107 and 108, respectively.

The temperature converter 109 conducts temperature conversion based on the detection signal generated on receiving and detecting the spectral list at the wavelength of 1.55±0.025 μm on the InGaAs photodiode 10% and generates the indication temperature $T_a$. In a similar manner, the temperature converter 110 generates the indication temperature $T_b$ by conducting a temperature conversion based on the detection sisal generated when the Si photodiode 108 receives and detects the spectral light at the wavelength ranging from 0.7 to 1.1 μm.

In this example, the temperature converters 409 and 110 use equation (26) which was described before for converting a finite spectral light as the temperature conversion equation and use specific parameters $A_a$, $B_a$, $C_a$, and $A_b$, $B_b$, $C_b$, respectively.

The InGaAs photodiode 107 and the temperature converter 109 structure the No. 1 monochrome radiation thermometer, and the Si photodiode 108 and the temperature converter 110 structure the No. 2 monochrome radiation thermometer.

The reference number 111 denotes the calculation section which computes the true temperature T through a correction calculation to eliminate the effect of optical fiber length from the temperature indication values $T_a$ and $T_b$ which are generated from the No. 1 and No. 2 radiation thermometers. The calculation section 111 performs the computation using either one of equation (41), (44), or (46).

When the calculation section 111 is structured with a digital signal processor (DSP) or a central processing unit (CPU) and when it conducts digital computation, the calculation of equation (44) is easy if only the entered data are converted to digital signals. Also when the calculation section is structured with an analog calculator, equation (46) is easily calculated because equation (46) is a linear approximation equation. An optimum calculation equation can be selected taking into account of measuring accuracy, computation time, and cost.

In the case that equation (44) is adopted as the calculation equation for the calculation section 11, the true temperature T is determined from equation (44) using two parameters $A_a$, $B_a$, and $A_b$, $B_b$ for temperature conversion specific to No. 1 and No. 2 radiation thermometers, optical fiber transmission loss $D_a$ and $D_b$ at each light-receiving and detecting wave band, and two indication temperatures $T_a$ and $T_b$ generated from each of the radiation thermometers.

Figure 11:
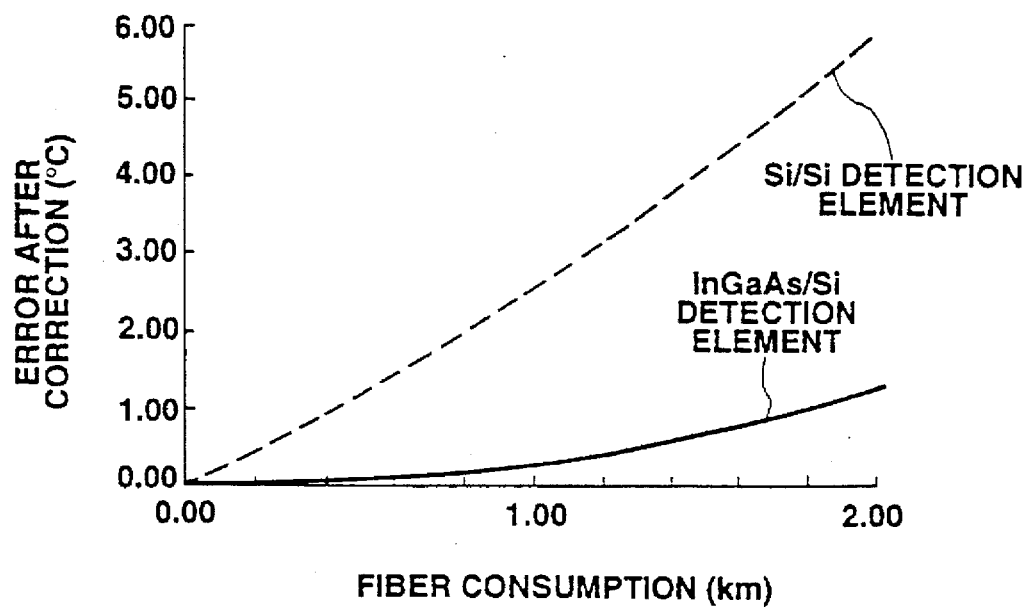
FIG. 11 shows a relation between a fiber consumption and an error after correction according to the present invention.

FIG. 11 shows an observed result of the consumable optical fiber thermometer of FIG. 10 where the calculation section 111 used the correction calculation equation (44).

The solid line of FIG. 11 was drawn using the InGaAs photodiode and the Si photodiode having the structure of FIG. 10 and applying a correction by equation (44). The broken line of FIG. 11 was drawn for comparison using the Si photodiode for both wavelengths and applying a correction by equation (44). In the solid line of FIG. 11, even a fiber consumption of 2 km arose, the error after correction was as small as 1.5° C., and the solid line indicates that a highly accurate measurement is possible compared with the broken line.

In the case that equation (46) is adopted as the calculation equation for the calculation section 11, the true temperature T is determined from equation (46) using two parameters $A_a$, $B_a$, and $A_b$, $B_b$ for temperature conversion specific to No. 1 and No. 2 radiation thermometers, optical fiber transmission loss $D_a$ and $D_b$ at each light-receiving and detecting wave band, two indication temperatures $T_a$ and $T_b$ generated from each of the radiation thermometers, and approximate values $T_a'$ and $T_b'$ to the two indication values. Since equation (46) is linear, it applies a simple calculation section 11 comprising an analog circuit.

Figure 12:
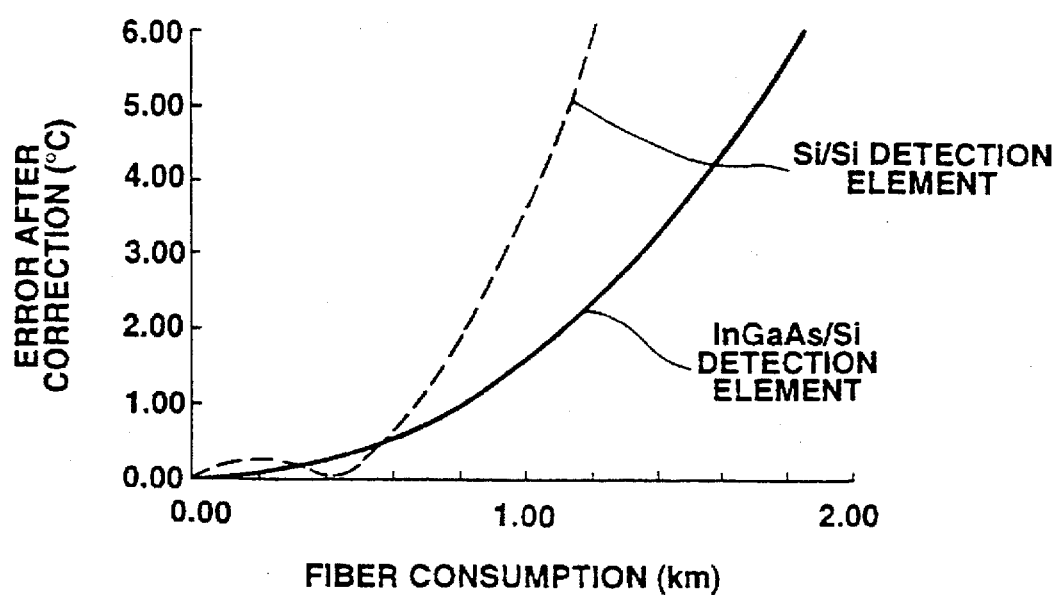
FIG. 12 shows another relation between a fiber consumption and an error after correction according to the present invention.

FIG. 12 shows an observed result of the consumable optical fiber thermometer of FIG. 10 where the calculation section 111 uses the correction calculation equation (46).

The solid line of FIG. 12 is drawn using the InGaAs photodiode and the Si photodiode both having the structure of FIG. 10 and applying a correction by equation (46). The broken line of FIG. 12 is drawn for comparison using the Si photodiode for both wavelengths and applying a correction by equation (46). In the solid line of FIG. 12, even a fiber consumption of 1 km arise, the error after correction is as small as ±2° C. Since this case uses an approximation calculation, the accuracy is lower than the case of solid line of FIG. 11. Nevertheless, the case of solid line is superior to the ease of broken line, and the former gives a sufficient accuracy for practical use showing about 0.2° C. of error at 100 m of fiber consumption.

The characteristics of the narrow band wave selective filter 105 in FIG. 10 are the central wavelength of 1.55 μm and the transmission band width of within ±0.025 μm, as an example. However, the present invention is not limited by the characteristics. The central wavelength needs to avoid 1.4 μm which is the absorption band of OH group. The wavelength may be in the vicinity of 1.55 μm or may be shifted from 1.55 μm toward the long wavelength side if the wave band provides a detection signal necessary for the light-receiving and detection device to convert into temperature in the succeeding step.

The transmission band width my be widened to, for example, a degree of ±0.1 μm from the central wavelength. If the detection light quantity is increased without accompanying a degradation of S/N ratio, the widening of transmission band width is acceptable.

As described above, according to the present invention, a consumable optical fiber thermometer receives a radiation light emitted from a high temperature target at an end of the optical fiber and transmits the received radiation light therethrough and determines a temperature of the high temperature target using a radiation thermometer which receives and detects the radiation light emitted from other end of the optical fiber to convert into temperature. And a narrow band wave selective filter is provided for allowing transmission of only a narrow band spectral light having a central wave length of 1.55 μm or near to 1.55 μm in the light emitted from the other end of the optical fiber and for making the radiation thermometer receive and detect the transmitted light. As a result, in the ease that the temperature of the target is at around 1500° C., the temperature error becomes 2° to 3° C. within 100 m of optical fiber consumption. Accordingly, if the optical fiber is replaced to a new standard length at every 100 m of consumption, a long period of continuous measurement is attained at the above-described accuracy without applying correction calculation on the indication temperature of the radiation thermometer.

According to the present invention, the narrow band wave selective filter has a transmission band within a range of ±0.1 μm to the central wave length. Therefore, no effect of OH group absorption band at near 1.4 μm appears, and the radiation thermometer can use Wien's approximation equation which deals with a single spectrum.

According to the present invention, the radiation thermometer is provided with an InGaAs photodiode as a light-receiving and detecting device. Since the detection device uses an InGaAs photodiode, even when the quantity of detection light decreases by passing through the narrow band wave selective filter, the light does not mix in a dark current and allows for detecting the light quantity at a good S/N ratio.

According to the present invention, a consumable optical fiber thermometer is used to receive radiation light emitted from a high temperature target at an end of the optical fiber and to transmit the light therethrough and to receive and detect the light emitted from the other end thereof to determine the true temperature of the high temperature target. And the light emitted from the other end of the optical fiber is dispersed into two spectral groups and each of the groups is introduced to the first radiation thermometer and the second radiation thermometer, respectively, and wherein the first radiation thermometer receives and detects the light via a narrow band wave selective filter which makes the central wavelength of the introduced light to 1.55 μm or near to it and which makes the transmission band width within a range of ±0.1 μm to the central wavelength and converts the light into temperature. The second radiation thermometer receives and detects the introduced light via a wave band selective filter which transmits the light having a wave band different from the wave band which is received and detected by the second radiation thermometer and converts the detected light into temperature. The calculation means computes the true temperature of the high temperature target based on a specified equation using the parameters for temperature conversion, which parameters are specific to each of the first and the second radiation thermometers, using the transmission loss information of the optical fiber within each range of the light-receiving and detecting wave band, and using the two indication temperatures after temperature conversion generated from each of the radiation thermometers. The configuration enables the elimination of the effect of decreased fiber length, which effect is the severest problem of conventional consumable optical fiber thermometer, and enables temperature of a high temperature target such as molten metal to be determined continuously at a high accuracy, high response rate, and low cost. In particular, since the economy is improved by enabling the use of a long fiber of around 1 km, and since the maintenance ability is improved by the reduction of calibration work, the application field is significantly broadened. For example, an iron-making process showed a marked effect of improved accuracy of temperature control such as with respect to a converter, electric furnace, smelting furnace, and tundish in continuous casting.

According to the present invention, the first radiation thermometer is provided with an InGaAs photodiode as a light-receiving and detecting device which receives and detects light, and the second radiation thermometer is provided with an Si photodiode as a light-receiving and detecting device which receives and detects light. Therefore, both of these two receiving and detecting of devices perform receiving and detecting the incident light at a good S/N ratio while generating less noise than Ge photodiode does and while avoiding being mixed in a dark current even with a small quantity of incident light.

What is claimed is:

1. A method for measuring a true temperature using a consumable optical fiber, comprising the steps of:

receiving a light emitted from a high temperature liquid at a first end of a consumable optical fiber, the received light being transmitted through the consumable optical fiber to a second end of the consumable optical fiber;

dividing the received light into two light beams through a branching filter;

detecting a light of a first wave band from a first light beam of the two light beams by a first radiation thermometer;

converting the light of the first wave band into temperature to output a first temperature;

detecting a light of a second wave band from a second light beam of the two light beams by a second radiation thermometer, the second wave band being different from the first wave band;

converting the light of the second wave band into temperature to output a second temperature; and calculating the true temperature by using two first temperature-conversion-parameters inherent to the first radiation thermometer, a first transmission loss index in the first wave band by the first radiation thermometer, the outputted first temperature from the first radiation thermometer, two second temperature-conversion-parameters inherent to the second radiation thermometer, a second transmission loss index in the second wave band by the second radiation thermometer and the outputted second temperature from the second radiation thermometer;

wherein said calculating step calculates the true temperature by using the following equation:

$$T=\{(1/D_aA_a-1/D_bA_b)-2(B_a/D_aA_a^2T_a-B_b/D_bA_b^2T_b)\}\div\{(1/D_aA_aT_a-1/D_bA_bT_b)-2(B_a/D_aA_a^2T_a^2-B_b/D_bA_b^2T_b^2)\}$$

wherein

T: the true temperature, $T_a$: the first temperature outputted from the first radiation thermometer, $A_a$, $B_a$: the two first parameters inherent to the first radiation thermometer, $D_a$: the first transmission loss index of the optical fiber by the first radiation thermometer, $T_b$: the second temperature outputted from the second radiation thermometer, $A_b$, $B_b$: the two second parameters inherent to the second radiation thermometer, $D_b$: the second transmission loss index of the optical fiber by the second radiation thermometer.

2. The method of claim 1, wherein said optical fiber comprises a quartz fiber.

3. An apparatus for measuring a true temperature using a consumable optical fiber, comprising:

a consumable optical fiber for receiving a light emitted from a high temperature liquid at a first end thereof and transmitting the light to a second end thereof;

a branching filter for dividing the received light into two light beams;

a first radiation thermometer for detecting a light of a first wave band from a first light beam of the two light beams and converting the light of the first wave band into temperature to output a first temperature;

a second radiation thermometer for detecting a light of a second wave band from a second light beam of the two light beams and converting the light of the second wave band into temperature to output a second temperature, the second wave band being different from the first wave band; and calculation means for calculating the true temperature by using two first temperature-conversion-parameters inherent to the first radiation thermometer, a first transmission loss index in the first wave band by the first radiation thermometer, the outputted first temperature from the first radiation thermometer, two second temperature-conversion-parameters inherent to the second radiation thermometer, a second transmission loss index in the second wave band by the second radiation thermometer and the outputted second temperature from the second radiation thermometer;

wherein said calculation means calculates the true temperature by using the following equation:

$$T=\{(1/D_aA_a-1/D_bA_b)-2(B_a/D_aA_a^2T_a-B_b/D_bA_b^2T_b)\}\div\{(1/D_aA_aT_a-1/D_bA_bT_b)-2(B_a/D_aA_a^2T_a^2-B_b/D_bA_b^2T_b^2)\}$$

wherein
- $T$: the true temperature,
- $T_a$: the first temperature outputted from the first radiation thermometer,
- $A_a$, $B_a$: the two first parameters inherent to the first radiation thermometer,
- $D_a$: the first transmission loss index of the optical fiber by the first radiation thermometer,
- $T_b$: the second temperature outputted from the second radiation thermometer,
- $A_b$, $B_b$: the two second parameters inherent to the second radiation thermometer,
- $D_b$: the second transmission loss index of the optical fiber by the second radiation thermometer.

4. The apparatus of claim 3, wherein said optical fiber comprises a quartz fiber.

* * * * *

UNITED STATES PATENT AND TRADEMARK OFFICE
CERTIFICATE OF CORRECTION

PATENT NO. : 5,730,527
DATED : March 24, 1998
INVENTOR(S) : Takamitsu TAKAYAMA et al.

It is certified that error appears in the above-identified patent and that said Letters Patent is hereby corrected as shown below:

Column 6, line 65, change "f or" to --for--;

Column 8, line 30, change "From" to --from--;

Column 15, line 6, change "ease" to --case--; and after "therefore" delete "the";

Column 17, line 59, change "hand" to --band--;
line 66, change "my" to --may--;

Column 18, line 8, change "For" to --for--;

Column 19, line 44, change "fop" to --for--;

Column 20, line 18, change "re" to --are--;

Column 22, line 22, change "/$D_aA$=" to --/$D_aA_a$=--;

Column 23, line 29, change "30" to --+--;

Column 26, line 20, change "ease" to --case--.

Signed and Sealed this

Eighth Day of August, 2000

Attest:

Q. TODD DICKINSON

*Attesting Officer*     *Director of Patents and Trademarks*